United States Patent
Suzuki et al.

(10) Patent No.: US 6,603,815 B2
(45) Date of Patent: Aug. 5, 2003

(54) VIDEO DATA PROCESSING APPARATUS, VIDEO DATA ENCODING APPARATUS, AND METHODS THEREOF

(75) Inventors: Takao Suzuki, Kanagawa (JP); Atsushi Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/094,774

(22) Filed: Mar. 11, 2002

(65) Prior Publication Data

US 2002/0101924 A1 Aug. 1, 2002

Related U.S. Application Data

(63) Continuation of application No. 09/391,849, filed as application No. PCT/JP98/03793 on Aug. 26, 1998.

(51) Int. Cl.$^7$ ................................................. H04N 7/12
(52) U.S. Cl. .................................................. 375/240.2
(58) Field of Search ......................... 375/240.12, 240.2; 382/232; H04N 7/12

(56) References Cited

U.S. PATENT DOCUMENTS 6,041,142 A  3/2000  Rao et al. .................... 382/232

FOREIGN PATENT DOCUMENTS

| JP | 8-265639 | 10/1996 |
|---|---|---|
| JP | 9-168148 | 6/1997 |
| JP | 9-284757 | 10/1997 |
| JP | 10-145779 | 5/1998 |

*Primary Examiner*—Young Lee
*Assistant Examiner*—Nancy Rose
(74) *Attorney, Agent, or Firm*—Frommer Lawrence & Haug LLP; William S. Frommer; Gordon Kessler

(57) ABSTRACT

A pattern analyzing portion analyzes a pattern of a detected repeat field and determines whether or not the pattern of the repeat field is continuous. An inverse pull-down controlling portion controls a memory to read video data in such a manner that the repeat field detected by a comparator is removed from input video data in a period that the pattern of the repeat field is continuous. The inverse pull-down controlling portion controls the memory to read video data in such a manner that a repeat field detected by the comparator is not removed from the input video data in a period that the pattern of the repeat field is discontinuous. In other words, an inverse 2:3 pull-down process is controlled corresponding to the continuity of a pattern of a repeat field. In addition, it is determined whether an input original material is a progressive-scanned video material or an interlace-scanned video material corresponding to the continuity of the pattern of the repetitive material.

19 Claims, 11 Drawing Sheets

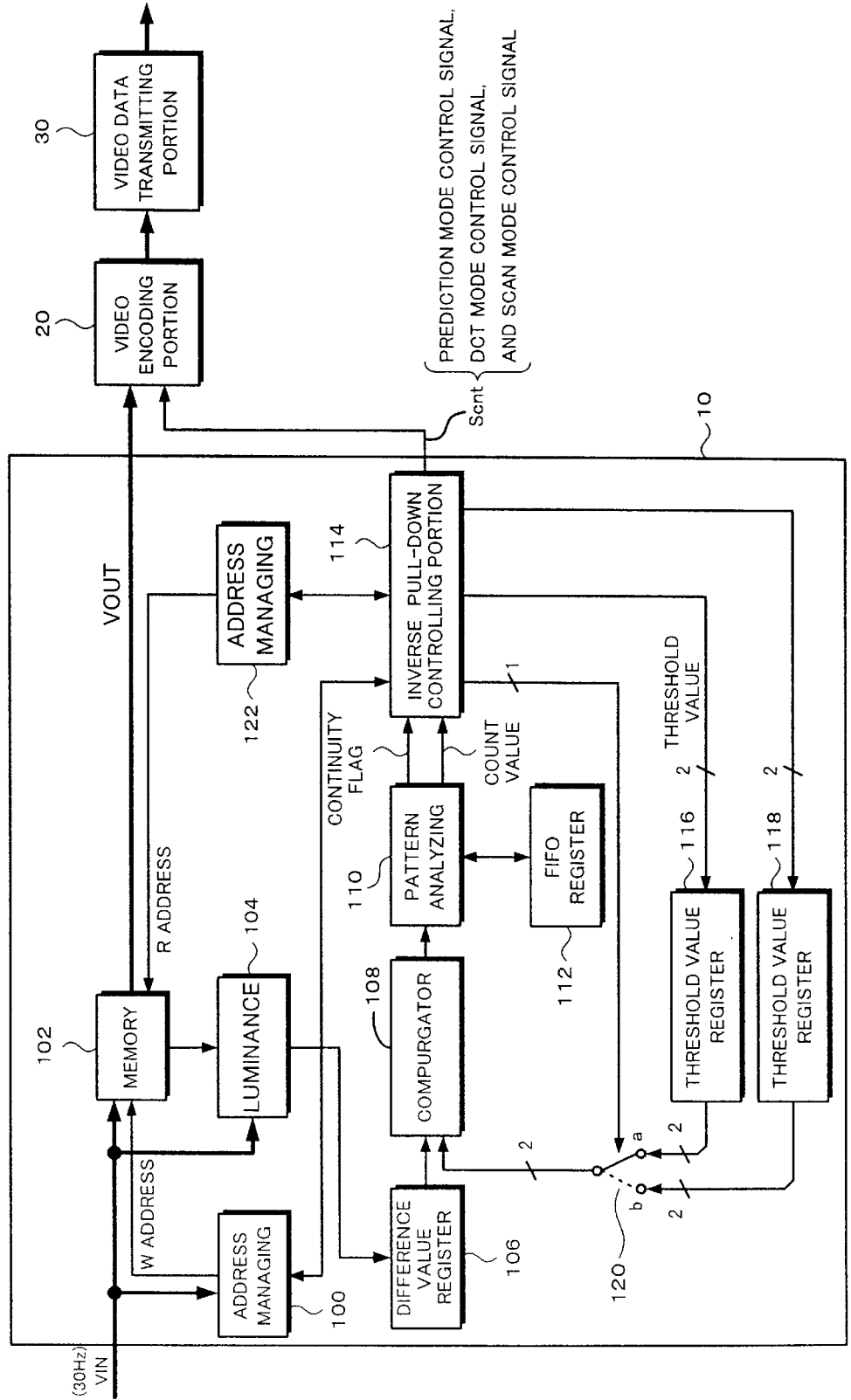

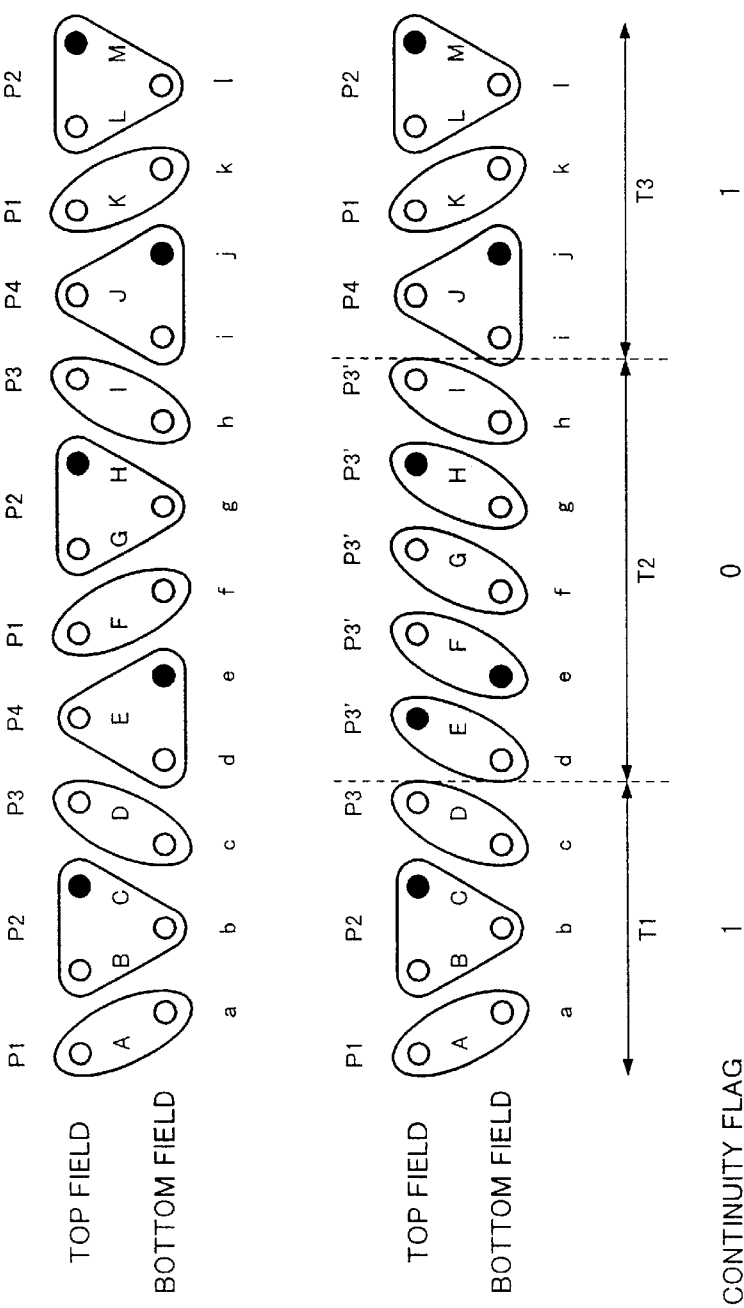

VIDEO DATA PROCESSING APPARATUS, VIDEO DATA ENCODING APPARATUS, AND METHODS THEREOF

This is a Continuation of U.S. application Ser. No. 09/391,849, filed Sep. 8, 1999, which is a continuation of International Application PCT/JP98/03793 filed Aug. 26, 1998.

TECHNICAL FIELD

The present invention relates to a video data processing apparatus and a method thereof for performing an inverse 2:3 pull-down process for a television signal of which a film material has been processed with 2:3 pull-down process so as to remove redundant fields. In addition, the present invention relates to a video data encoding apparatus and a method thereof for effectively compression-encoding video data that has been processed with the inverse 2:3 pull-down process.

BACKGROUND ART

A telecine unit that converts a film material recorded on an optical film for a movie and so forth into a television signal has been proposed. Generally, on a film material that is used for a movie theater, pictures have been recorded at a frame rate of 24 Hz (24 frames per second). Thus, the frame rate of a film material is completely different from that of an NTSC format television signal at a frame rate of 29.97 Hz. Thus, in the telecine unit, a process for converting 24 frames into 30 frames is performed. In such a process, two fields of an original film material are converted into three fields in a predetermined sequence. Thus, such a process is referred to as 2:3 pull-down process. In reality, a particular field of an original film material is repeated in a predetermined sequence. The repeated field is inserted between fields of the original film material (hereinafter, the repeated field is referred to as repeat field). Thus, with the film material at a frame rate of 24 Hz, a television signal at a frame rate of 30 Hz is generated.

Video data converted into a television signal by the telecine unit is compression-encoded by a compression-encoding technique such as MPEG encoding method. The encoded video stream is recorded on a record medium or transmitted to a transmission medium. Before video data that has been processed with the 2:3 pull-down process is compression-encoded, the repeat fields are removed so as to improve the compression-encoding efficiency. This is because the repeat fields are redundant fields that have been added with the 2:3 pull-down process. Thus, even if these repeat fields are removed, the picture quality does not deteriorate. A process for removing redundant fields added with the 2:3 pull-down process is referred to as inverse 2:3 pull-down process.

To remove repeat fields in the inverse 2:3 pull-down process, the repeat fields should be detected. To detect repeat fields, a simple algorithm is used. In the algorithm, the luminance difference between two fields (first and second fields) is calculated. When the luminance difference is almost "0", it is determined that the second field is a repeat field.

However, since video data that has been processed with the 2:3 pull-down process is data of which a material optically recorded on an optical film is converted into a television data, the video data contains noise due to a miss-alignment of the film or dust and stain thereof. Thus, when video data that has been processed with the 2:3 pull-down process is processed with the inverse 2:3 pull-down process by a conventional repeat field detecting algorithm, if noise contained in the video data is small, repeat fields can be accurately detected. However, if noise contained in the video data is very large, normal fields (=not repeat fields) may be incorrectly determined as repeat fields.

In a broadcasting station, a video program production company, and so forth, video data generated from film material is not transmitted without editing process as a television program. Instead, a television program is generated by inserting new video data such as commercial program in the video data generated from film material by video editing process. The new video data is not video data generated from a film material, but video data (with a frame frequency of 29.97 Hz) that has been shot by a video camera or the like. In other words, the edited video program is including both video data generated from a film material by the 2:3 pull-down process (the frame frequency of the original material is 24 Hz) and normal video data (the frame frequency of the original material is 29.97 Hz).

When the inverse 2:3 pull-down process is performed for the edited video program using the above-described repeat field detecting algorithm, as long as the above-described noise is not abnormally large, repeat fields are removed from the video data generated from the film material. However, when the inverse 2:3 pull-down process is performed using the repeat field detecting algorithm, normal fields may be detected as repeat fields. When new inserted video data is similar to a still picture rather than moving picture, the probability of which normal fields are incorrectly detected as repeat fields becomes high.

In other words, in the conventional inverse 2:3 pull-down process, normal fields may be incorrectly detected as repeat fields. Thus, in the conventional inverse 2:3 pull-down process, repeat fields cannot be accurately removed. When normal fields are determined as repeat fields, the normal fields are removed from video data that has been processed with the inverse 2:3 pull-down process. As a result, field drop-outing of the normal field may occur.

Unlike with a storage system that records a supplied source material to a storage medium, in a digital broadcasting system, a source material should be processed and transmitted to individual subscribers on real time basis. Moreover, in the digital broadcasting system, the field drop-outing should be avoided from taking place in video data. In other words, in the digital broadcasting system, video data free of unnatural motion should be transmitted as an essential condition. The requirement of video data free of unnatural motion is superior to the requirement of the transmission efficiency using the inverse 2:3 pull-down process.

Thus, in a conventional digital broadcasting system, to completely prevent the field drop-outing from taking place in transmission video data, the inverse 2:3 pull-down process has not been performed at all. Consequently, the compression efficiency deteriorates by around 25% in comparison with the case that repeat fields are fully removed.

DISCLOSURE OF THE INVENTION

Therefore, an object of the present invention is to provide a video data processing apparatus and a video data processing method for performing an inverse 2:3 pull-down process for video data that has been processed with a 2:3 pull-down process in the case that video data generated from a film material is compression-encoded and broadcast free from a frame skip due to an incorrect detection of a repeat field.

Another object of the present invention is to provide a video data encoding apparatus and a video data encoding method for performing the above-described inverse 2:3 pull-down process and for performing a compression-encoding process for video data with high compression efficiency.

To accomplish the above object, claim 1 of the present invention is a video data processing apparatus for removing a repeat field from video data, comprising a repeat field detecting means for detecting the repeat field contained in the video data, an analyzing means for analyzing a pattern of the repeat field contained in the video data corresponding to the detected results of the repeat field detecting means and determining whether the pattern of the repeat field is continuous or discontinuous, a video data processing means for removing the repeat field contained in the video data, and a controlling means for controlling the video data processing means to remove a field determined as a repeat field by the repeat field detecting means from the video data in a period that the patten of the repeat field is determined continuous by the analyzing means and for controlling the video data processing means not to remove a field determined as a repeat field by the repeat field detecting means from the video data in a period that the pattern of the repeat field is determined discontinuous by the analyzing means.

Another aspect of the present invention is a video data processing apparatus for removing a repeat field from video data, comprising a repeat field detecting means for detecting the repeat field contained in the video data, an analyzing means for determining whether or not an occurrence sequence of the repeat field contained in the video data is regular corresponding to the detected results of the repeat field detecting means, a video data processing means for removing the repeat field contained in the video data, and a controlling means for controlling the video data processing means to remove a field determined as a repeat field by the repeat field detecting means from the video data in a period that the occurrence sequence of the repeat field is determined regular by the analyzing means and for controlling the video data processing means not to remove a field determined as a repeat field by the repeat field detecting means from the video data in a period that the occurrence sequence of the repeat field is determined irregular by the analyzing means.

Another aspect of the present invention is a video data processing apparatus for processing video data of which a first video material of which an original material is processed with 2 3 pull-down process and a second video material of an original material with a frequency of a normal television signal coexist, comprising an analyzing means for analyzing a repetitive pattern of the repeat field contained in the video data and determining whether a current field of the video data is a field of the first video material or a field of the second video material, a video data processing means for removing the repeat field from the video data, and a controlling means for controlling the operation of the video data processing means corresponding to the analyzed results of the analyzing means.

Another aspect of the present invention is a video data processing apparatus for processing video data field by field, a progressive-scanned video material and an interlace-scanned video material coexisting in the video data, comprising an analyzing means for analyzing the continuity of a repeat field contained in the video data and determining whether the current field of the video data is a field of the progressive-scanned video material or a field of the interlace-scanned video material, a video data processing means for removing the repeat field from the video data, and a controlling means for controlling the video data processing means to remove a repeat field contained in the progressive-scanned video material and not to remove a field contained in the interlace-scanned video material corresponding to the analyzed results of the repeat field analyzing means.

Another aspect of the present invention is a video data processing method for removing a repeat field from video data, comprising the steps of detecting the repeat field contained in the video data, analyzing a pattern of the repeat field contained in the video data corresponding to the detected results of the repeat field detecting step and determining whether the pattern of the repeat field is continuous or discontinuous, removing the repeat field contained in the video data, and controlling the video data processing step to remove a field determined as a repeat field by the repeat field detecting step from the video data in a period that the patten of the repeat field is determined continuous by the analyzing step and the video data processing step not to remove a field determined as a repeat field by the repeat field detecting step from the video data in a period that the pattern of the repeat field is determined discontinuous by the analyzing step.

Another aspect of the present invention is a video data processing method for removing a repeat field from video data, comprising the steps of detecting the repeat field contained in the video data, determining whether or not an occurrence sequence of the repeat field contained in the video data is regular corresponding to the detected results of the repeat field detecting step, removing the repeat field contained in the video data, and controlling the video data processing step to remove a field determined as a repeat field by the repeat field detecting step from the video data in a period that the occurrence sequence of the repeat field is determined regular by the analyzing step and the video data processing step not to remove a field determined as a repeat field by the repeat field detecting step from the video data in a period that the occurrence sequence of the repeat field is determined irregular by the analyzing step.

Another aspect of the present invention is a video data processing method for processing video data of which a first video material of which an original material is processed with 2 3 pull-down process and a second video material of an original material with a frequency of a normal television signal coexist, comprising the steps of analyzing a repetitive pattern of the repeat field contained in the video data and determining whether a current field of the video data is a field of the first video material or a field of the second video material, removing the repeat field from the video data, and controlling the operation of the video data processing means corresponding to the analyzed results of the analyzing step.

Another aspect of the present invention is a video data processing method for processing video data field by field, a progressive-scanned video material and an interlace-scanned video material coexisting in the video data, comprising the steps of analyzing the continuity of a repeat field contained in the video data and determining whether the current field of the video data is a field of the progressive-scanned video material or a field of the interlace-scanned video material, removing the repeat field from the video data, and controlling the video data processing step to remove a repeat field contained in the progressive-scanned video material and not to remove a field contained in the interlace-scanned video material corresponding to the analyzed results of the repeat field analyzing step.

Another aspect of the present invention is a video data encoding apparatus for encoding video data in which a repeat field is placed in a predetermined sequence, comprising, an analyzing means for analyzing a pattern of the repeat field contained in the video data and determining whether or not the pattern of the repeat field is continuous, a video data processing means for removing the repeat field from the video data, an encoding means for encoding video data that is output from the video data processing means, and a controlling means for controlling the video data processing means to remove a field determined as a repeat field by the repeat field detecting means and perform an encoding process in a frame prediction mode and a frame DCT mode in a period that the pattern of the repeat field is determined continuous by the analyzing means and for controlling the video processing means not to remove a field determined as a repeat field by the repeat field detecting means and perform an encoding process in one of a frame prediction mode and a field prediction mode and one of a frame DCT mode and a field DCT mode in a period that the pattern of the repeat field is determined discontinuous by the analyzing means.

Another aspect of the present invention is a video data encoding apparatus for encoding video data of which a first video material of which an original material is processed with 2:3 pull-down process and a second video material of an original material with a frequency of a normal television signal coexist, comprising an analyzing means for analyzing a repetitive pattern of the repeat field contained in the video data and determining whether the current field of the video data is a field of the first video material or a field of the second video material, a video data processing means for removing the repeat field from the video data, an encoding means for encoding video data that is output from the video data processing means, and a controlling means for controlling an operation of the video data processing means and an encoding mode of the encoding means corresponding to the analyzed results of the analyzing means.

Another aspect of the present invention is a video data encoding apparatus for encoding video data of which a progressive-scanned video material and an interlace-scanned video material coexist, comprising an analyzing means for analyzing the continuity of a repeat field contained in the video data and determining whether the video data is the progressive-scanned video data or the interlace-scanned video data, a video data processing means for removing the repeat field from the video data, an encoding means for encoding video data that is output from the video data processing means, and a controlling means for controlling the video data processing means to remove a repeat field contained in the progressive-scanned video material and not to remove a field contained in the interlace-scanned video material corresponding to the analyzed results of the analyzing means and for controlling the encoding means to select an encoding mode corresponding to the progressive-scanned video material or the interlace-scanned video material.

Another aspect of the present invention is a video data encoding apparatus for encoding video data of which a progressive-scanned video material and an interlace-scanned video material coexist, comprising an analyzing means for analyzing the continuity of a repeat field contained in the video data and determining whether the video data is the progressive-scanned video data or the interlace-scanned video data, a video data processing means for removing the repeat field from the video data, an encoding means for encoding video data that is output from the video data processing means, and a controlling means for controlling the video data processing means to remove a repeat field contained in the video data and the encoding means to perform an encoding process in an encoding mode corresponding to the progressive-scanned video material when the video data is determined as the progressive-scanned video material by the analyzing means and for controlling the video data processing means not to remove a repeat field contained in the video data and the encoding means to perform an encoding process in an encoding mode corresponding to the interlace-scanned video material when the video data is determined as the interlace-scanned video material by the analyzing means.

Another aspect of the present invention is a video data encoding apparatus for encoding video data in which a repeat field is placed, comprising a video data processing means for removing the repeat field from the video data, an encoding means for encoding video data that has been processed by the video data processing means, and a controlling means for analyzing the continuity of a repeat field contained in the video data, determining whether a pattern of the repeat field contained in the video data is continuous or discontinuous, and controlling an operation of the video data processing means and an encoding mode of the encoding means.

Another aspect of the present invention is a video data encoding apparatus for encoding video data in which a repeat field is placed, comprising a video data processing means for removing the repeat field from the video data, an encoding means for encoding video data that has been processed by the video data processing means, and a controlling means for analyzing the continuity of a repeat field contained in the video data, determining whether an original material of the video data is a progress-scanned video material or interlace-scanned video data, and controlling an operation of the video data processing means and an encoding mode of the encoding means.

Another aspect the present invention is a video data encoding method for encoding video data in which a repeat field is placed in a predetermined sequence, comprising the steps of analyzing a pattern of the repeat field contained in the video data and determining whether or not the pattern of the repeat field is continuous, removing the repeat field from the video data, encoding video data that is output from the video data processing step, and controlling the video data processing step to remove a field determined as a repeat field by the repeat field detecting step and perform an encoding process in a frame prediction mode and a frame DCT mode in a period that the pattern of the repeat field is determined continuous by the analyzing step and for controlling the video processing step not to remove a field determined as a repeat field by the repeat field detecting step and perform an encoding process in one of a frame prediction mode and a field prediction mode and one of a frame DCT mode and a field DCT mode in a period that the pattern of the repeat field is determined discontinuous by the analyzing step.

Another aspect of the present invention is a video data encoding method for encoding video data of which a first video material of which an original material is processed with 2 3 pull-down process and a second video material of an original material with a frequency of a normal television signal coexist, comprising the steps of analyzing a repetitive pattern of the repeat field contained in the video data and determining whether the current field of the video data is a field of the first video material or a field of the second video material, removing the repeat field from the video data, encoding video data that is output from the video data processing step, and controlling an operation of the video data processing step and an encoding mode of the encoding step corresponding to the analyzed results of the analyzing step.

Another aspect of the present invention is a video data encoding method for encoding video data of which a progressive-scanned video material and an interlace-scanned video material coexist, comprising the steps of analyzing the continuity of a repeat field contained in the video data and determining whether the video data is the progressive-scanned video data or the interlace-scanned video data, removing the repeat field from the video data, encoding video data that is output from the video data processing step, and controlling the video data processing step to remove a repeat field contained in the progressive-scanned video material and not to remove a field contained in the interlace-scanned video material corresponding to the analyzed results of the analyzing step and for controlling the encoding step to select an encoding mode corresponding to the progressive-scanned video material or the interlace-scanned video material.

Another aspect of the present invention is a video data encoding method for encoding video data of which a progressive-scanned video material and an interlace-scanned video material coexist, comprising the steps of analyzing the continuity of a repeat field contained in the video data and determining whether the video data is the progressive-scanned video data or the interlace-scanned video data, removing the repeat field from the video data, encoding step for encoding video data that is output from the video data processing step, and controlling the video data processing step to remove a repeat field contained in the video data and the encoding step to perform an encoding process in an encoding mode corresponding to the progressive-scanned video material when the video data is determined as the progressive-scanned video material by the analyzing step and for controlling the video data processing step not to remove a repeat field contained in the video data and the encoding step to perform an encoding process in an encoding mode corresponding to the interlace-scanned video material when the video data is determined as the interlace-scanned video material by the analyzing step.

Another aspect of the present invention is a video data encoding method for encoding video data in which a repeat field is placed, comprising the steps of removing the repeat field from the video data, encoding video data that has been processed by the video data processing step, and analyzing the continuity of a repeat field contained in the video data, determining whether a pattern of the repeat field contained in the video data is continuous or discontinuous, and controlling an operation of the video data processing step and an encoding mode of the encoding step.

A final aspect of the present invention is a video data encoding method for encoding video data in which a repeat field is placed, comprising the steps of removing the repeat field from the video data, encoding video data that has been processed by the video data processing step, and analyzing the continuity of a repeat field contained in the video data, determining whether an original material of the video data is a progress-scanned video material or interlace-scanned video data, and controlling an operation of the video data processing step and an encoding mode of the encoding step.

BRIEF DESCRIPTION OF DRAWINGS

FIG. 2 is a block diagram showing a fundamental structure of a video data processing apparatus performing an inverse 2:3 pull-down process;

FIGS. 7A and 7B are schematic diagrams showing the results of a repeat field detecting process of a comparator;

BEST MODE FOR CARRYING OUT THE INVENTION

Figure 1A:
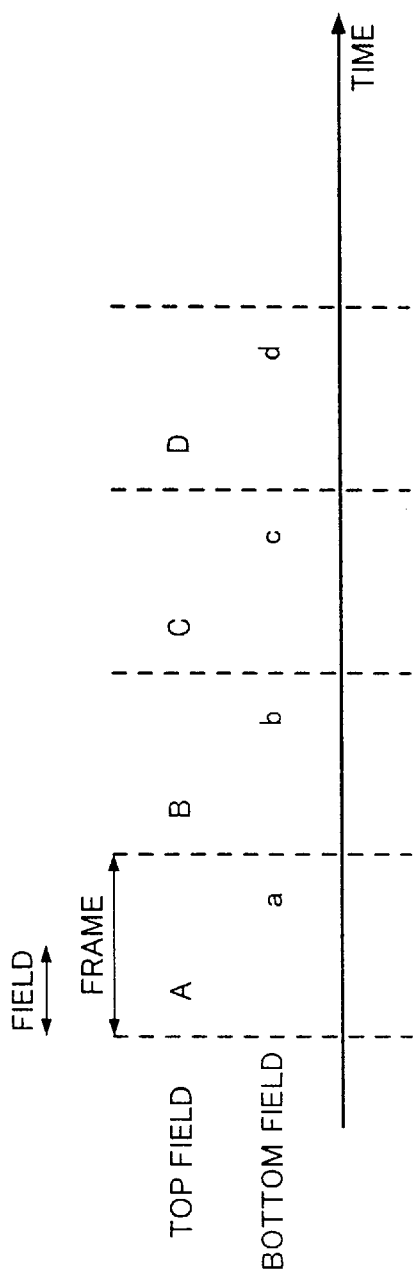
FIGS. 1A and 1B are schematic diagrams showing a 2:3 pull-down process.

For easy understanding of the concept of the present invention, with reference to FIG. 1, a process for converting a film material of 25 frames per second into an NTSC format television material of 30 frames per second (accurately, 29.97 frames per second) will be described. This process is referred to as 2:3 pull-down process. The film material has 24 frames per second. The same pictures of two fields (a top field and a bottom field) are formed with each frame. Thus, a picture signal of 48 fields per second is generated. Next, four frames (eight fields) of the film material are converted into for example an NTSC format video signal of five frames (10 fields). In FIG. 1A, reference letters A, B, C, and D represent top fields of the film material and reference letters a, b, c, and d represent bottom fields of the film material.

In the 2:3 pull-down process, particular fields (for example, A and c) of the film material are repetitively placed so as to increase the number of fields.

Figure 1B:
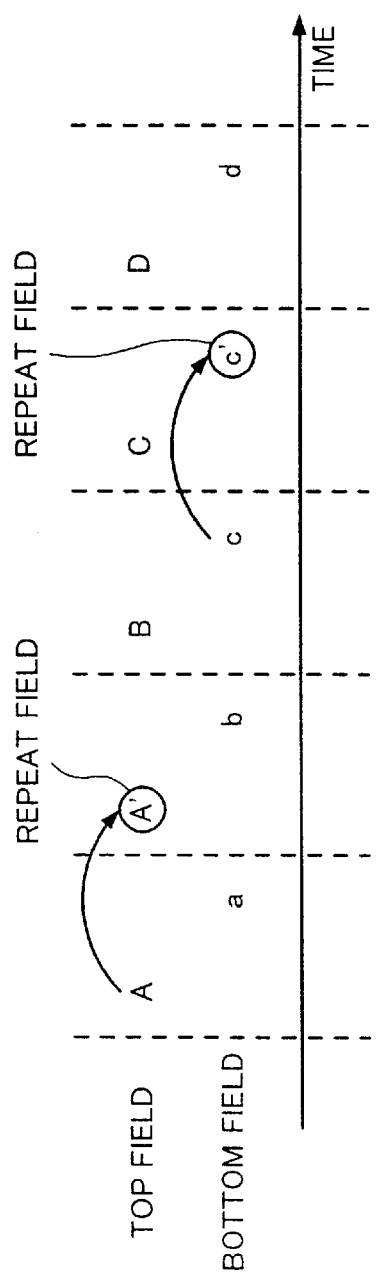

In the inverse 2:3 pull-down process, video data of repeat fields placed as shown in FIG. 1B is removed from video data at a frame rate of 30 frames per second. Thus, the video data at a frame rate of 30 frames per second is converted into video data at a frame rate of 24 frames par second as shown in FIG. 1A.

Next, with reference to FIG. 2, the structure of the video data processing apparatus according to an embodiment of the present invention will be described. The video data processing apparatus comprises an inverse pull-down processing portion 10, a video encoding portion 20, and a video data transmitting portion 30.

The inverse pull-down processing portion 10 is a block that performs the inverse 2:3 pull-down process for video data VIN of a television program generated from a film material by the 2:3 pull-down process. The video encoding portion 20 is a block that encodes the video data that has been processed with the inverse pull-down process corresponding to MPEG technology. The video data transmitting portion 30 is a block that converts an encoded video stream into a format for a transmission to subscribers and a format for a storage medium.

Next, the structures of the inverse pull-down processing portion 10 and the video encoding portion 20 will be described.

The inverse pull-down processing portion 10 comprises an address managing portion 100, a memory 102, a luminance difference calculating portion 104, a difference value register 106, a comparator 108, a pattern analyzing portion 110, a FIFO register 112, an inverse pull-down controlling portion 114, a first threshold value register 116, a second threshold value register 118, a switch circuit 120, and an address managing portion 122.

Figure 3:
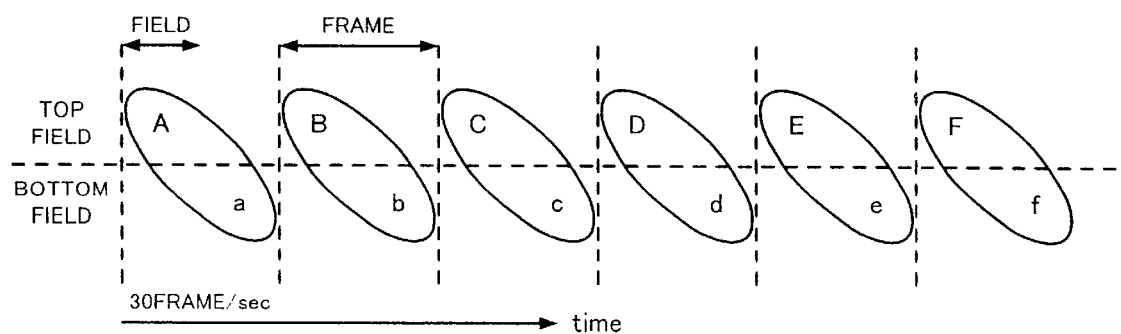
FIG. 3 is a schematic diagram showing video data that is processed with the 2:3 pull-down process and input to the video data processing apparatus.

FIG. 3 shows an example of a field structure of input video data VIN that is supplied from a telecine unit that performs the 2:3 pull-down process or a VTR unit that stores video data that has been processed with the 2:3 pull-down process to the inverse pull-down processing portion 10. In the example shown in FIG. 3, the video data VIN is (4:2:2) video data.

The address managing portion 100 generates a write address of the memory 102 for the input video data VIN for each field and supplies the generated write address to the memory 102. In addition, the address managing portion 100 supplies the write address of the memory 102 for the input video data VIN to the inverse pull-down controlling portion 114.

As shown in FIG. 3, the memory 102 buffers the source video data VIN for each field corresponding to the write address received from the address managing portion 100. In addition, the memory 102 reads video data corresponding to the read address received from the address managing portion 122 and outputs the video data as video data VOUT that has been processed with the inverse 2:3 pull-down process to the video encoding portion 20.

The luminance difference calculating portion 104 receives the input video data VIN for each field from the memory 102 and obtains the difference between two fields of the input video data VIN (hereinafter, the difference between fields is referred to as difference value). In reality, the luminance difference calculating portion 104 calculates the difference value between top fields with the difference between luminance components of two temporally continuous top fields. In addition, the luminance difference calculating portion 104 calculates the difference value between bottom fields with the difference between luminance components of two temporarily continuous bottom fields. The difference value is obtained by summing the absolute value of the difference between the luminance of pixels at the same positions on top fields (or bottom fields) of two temporally continuous frames for each pixel of one screen. The difference value may be obtained by summing the square of the difference between each pixel value. As another alternative method, instead of summing all pixels of one screen, the absolute value of the difference between each pixel value that is larger than a predetermined threshold value may be summed. As a further alternative method, the difference value may be obtained using color components along with luminance components of each pixel.

Figure 4:
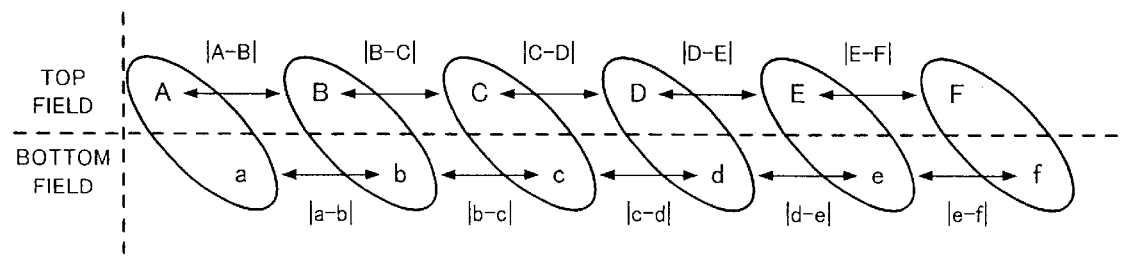
FIG. 4 is a schematic diagram showing a difference value calculating process of a luminance signal in a luminance difference calculating portion.

FIG. 4 is a schematic diagram showing a difference value calculating process performed by the luminance difference calculating portion 104 for a luminance signal. As shown in FIG. 4, the luminance difference calculating portion 10 successively calculates the difference values ($|A-B|$~$|D-E|$ . . . ) between two continuous top fields and the difference values ($|a-b|$~$|d-e|$ . . . ) between two continuous bottom fields. The calculated difference values are output to the difference value register 106.

The difference value register 106 is a register that stores the difference values for 10 frames (20 fields) received from the luminance difference calculating portion 104.

Figure 5:
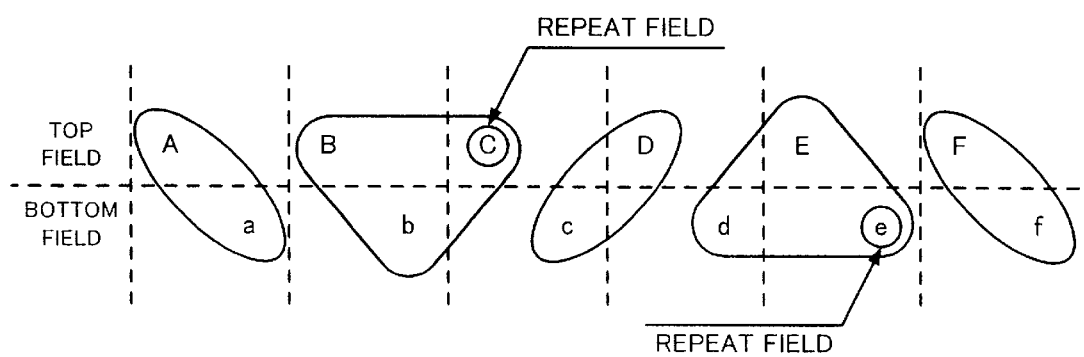
FIG. 5 is a schematic diagram showing video data that is processed with the 2:3 pull-down process and input to the video data processing apparatus.

The comparator 108 is a circuit that determines whether or not each field is a repeat field. When the comparator 108 determines whether or not a top field "C" shown in FIG. 5 is a repeat field, the comparator 108 calculates the following formula (1) with the difference values ($|A-B|$~$|D-E|$ . . . ) stored in the difference value register 106 and a threshold value "T" received from the switch circuit 120.

$|B-C| \approx 0$

AND $|A-B|-|B-C|>T$

AND $|C-D|-|B-C|>T$ \hfill (1)

When the conditions of the formula (1) are satisfied, the comparator 108 determines that the top field "C" is a repeat field. When the conditions of the formula (1) are not satisfied, the comparator 108 determines that the top field "C" is not a repeat field. The comparator 108 performs the repeat field determining process using the formula (1) for all top fields.

Likewise, when the comparator 108 determines whether or not a bottom field e shown in FIG. 5 is a repeat field, the comparator 108 calculates the following formula (2) with the difference values ($|a-b|$~$|d-e|$ . . . ) and the threshold value T received from the switch circuit 120.

$|d-e| \approx 0$

AND $|c-d|-|d-e|>T$

AND $|e-f|-|d-e|>T$ \hfill (2)

When the conditions of the formula (2) are satisfied, the comparator 108 determines that the bottom field e is a repeat field. When the conditions of the formula (2) are not satisfied, the comparator 108 determines that the bottom field e is not a repeat field. The comparator 108 performs the repeat field determining process using the formula (2) for all bottom fields.

Next, the theory of the repeat field determining process of the comparator 108 corresponding to the formulas (1) and (2) will be described. As described above, the repeat field C is a repeat field of the top field B in the 2:3 pull-down process. The repeat field e is a repeat field of the bottom field d in the 2:3 pull-down process. Thus, the field C almost matches the field B. The field e almost matches the field d. Thus, each of the difference value $|B-C|$ and the difference value $|d-e|$ of temporally adjacent fields is almost 0. However, due to noise in the 2:3 pull-down process, each of the difference values is not exactly 0.

When a reference top field satisfies the conditions of the formula (1), the comparator 108 outputs a flag "1" that represents that the reference field is a repeat field to the pattern analyzing portion 110. When the reference top field does not satisfy the conditions of the formula (1), the comparator 108 outputs a flag "0" that represents that the reference field is a normal field to the pattern analyzing portion 110. Likewise, when the reference bottom field satisfies the conditions of the formula (2), the comparator 108 outputs a flag "1" that represents the reference bottom field is a repeat field to the pattern analyzing portion 110. When the reference bottom field does not satisfy the conditions of the formula (2), the comparator 108 outputs a flag "0" that represents that the reference bottom field is a normal field to the pattern analyzing portion 110.

The pattern analyzing portion 110 is a circuit that analyzes whether or not patterns of repeat fields of the input video data VIN are continuous. When the patterns are continuous, it means that the occurrence sequence of the repeat fields of the input video data VIN is regular. On the other hand, when the patterns are discontinuous, it means that the occurrence sequence of repeat fields of the input video data VIN is irregular or that repeat fields are not contained in the input video data VIN.

The pattern analyzing portion 110 receives a flag "1" that represents a repeat field and a flag "0" that represents a normal field from the comparator 108 and stores the received flag data to the FIFO register 112.

Figure 6:
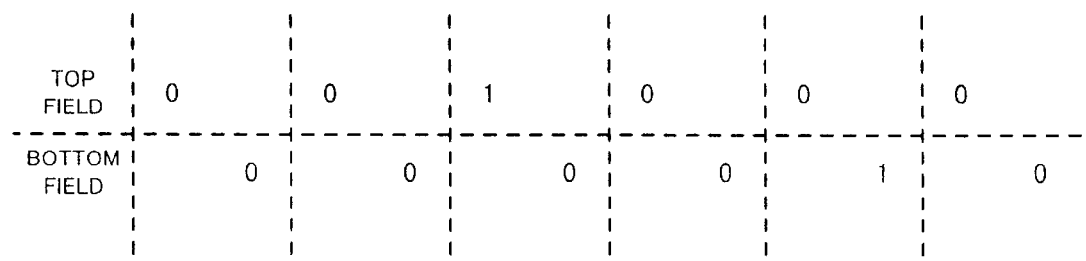
FIG. 6 is a schematic diagram showing an example of data stored in a FIFO register in the case that repetitive patterns are detected.

The FIFO register 112 stores the latest flags for two seconds (for 120 fields). When the pattern analyzing portion 110 detects repetitive patterns shown in FIG. 5, data shown in FIG. 6 is stored in the FIFO register 112. Data stored in the FIFO register 112 is updated for each field under the control of the pattern analyzing portion 110. Thus, the FIFO register 112 usually stores 120 flags corresponding to the latest 120 fields.

The pattern analyzing portion 110 searches 120 flags stored in the FIFO register 112 and determines whether or not patterns of repeat fields of the input video data VIN are continuous based on a predetermined pattern detecting algorithm. When the patterns of the repeat fields of the input video data are continuous, the pattern analyzing portion 110 supplies a continuity flag "0" that represents that the patterns are continuous to the inverse pull-down controlling portion 114. When the patterns of the repeat fields of the input video data are discontinuous, the pattern analyzing portion 110 supplies a continuity flag "0" that represents that the patterns are discontinuous to the inverse pull-down controlling portion 114.

Next, with reference to FIGS. 7 to 10, the pattern detecting algorithm will be described in detail.

Figures 8A, 8B:
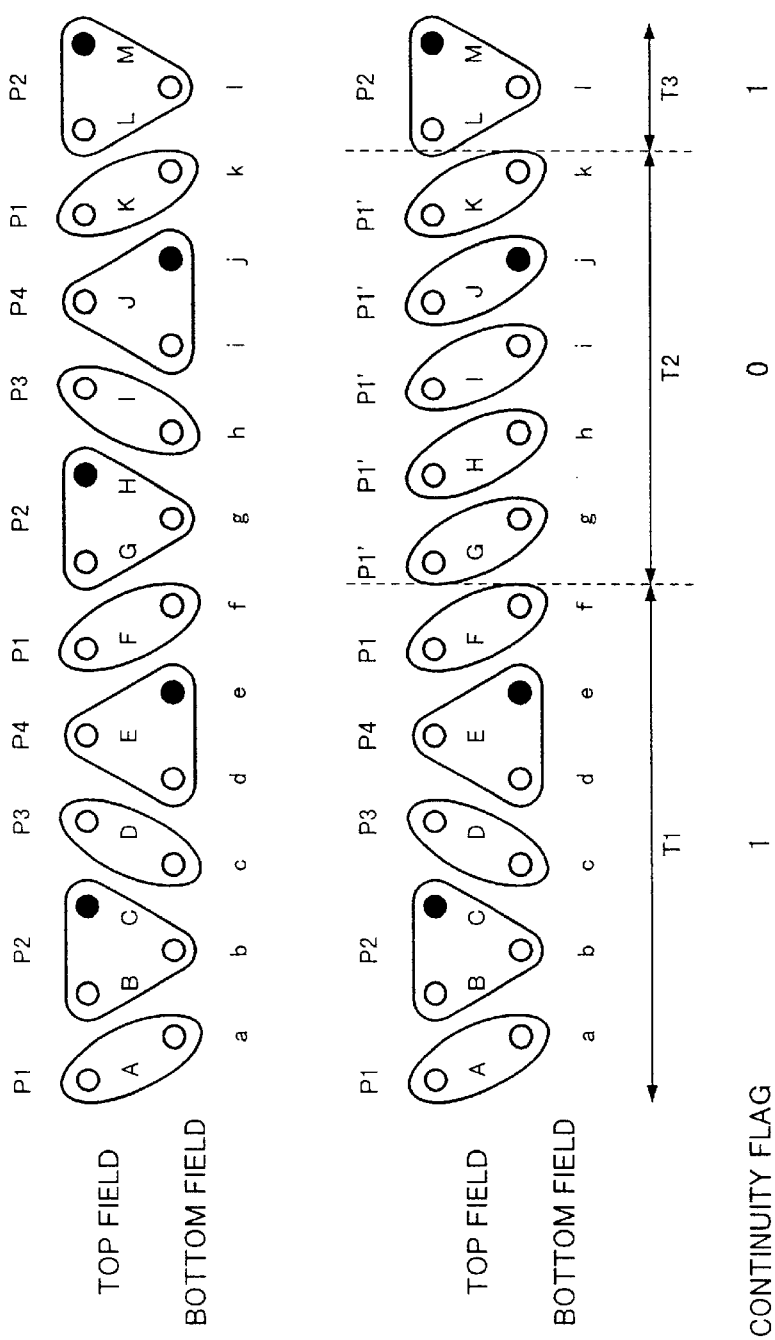
FIGS. 8A and 8B are schematic diagrams showing results of the repeat field detecting process of the comparator.

FIGS. 7 and 8 show results of the repeat field detecting process of the comparator 108. In FIGS. 7 and 8, black circles represent repeat fields determined by the comparator 108 and white circles represent normal fields determined by the comparator 108. FIGS. 7A and 8A show examples of which patterns of repeat fields of the input video data VIN are continuous. FIGS. 7B and 8B show two examples of which patterns of repeat fields of the input video data VIN are discontinuous.

Since the 2:3 pull-down process is a process for inserting repeat fields in a regular sequence, when the repeat field detecting process is performed for video data that has been processed with the 2:3 pull-down process, patterns as shown in FIGS. 7A and 8A are obtained. The patterns shown in FIGS. 7A and 8A show that video data that has been processed with the 2:3 pull-down process is formed with four patterns P1, P2, P3, and P4.

The pattern P1 is a pattern formed with two fields of one normal top field and one normal bottom field. The pattern P2 is a pattern formed with three fields of a normal top field, a normal bottom field, and a top field determined as a repeat field. The pattern P3 is a pattern formed with two fields of a normal bottom field and a normal top field. The pattern P4 is a pattern formed with three fields of a normal bottom field, a normal top field, and a bottom field determined as a repeat field.

In the examples shown in FIGS. 7A and 8A, since the four patterns P1 to P4 are regularly and continuously detected, it is determined that the patterns of the repeat fields of the input video data VIN are continuous.

FIG. 7B shows an example of which patterns of repeat fields are discontinuous. The patterns shown in FIG. 7B are different from those shown in FIG. 7A in that the top field "E" is a repeat field. Precisely speaking, although the top field "E" should have been detected as a normal field originally, the top field "E" had been incorrectly detected as a repeat field in the repeat field detecting process.

When the top field "E" is determined as a repeat field, the pattern P4 cannot be formed with three fields "d", "E", and "e" that are preceded by the pattern P3. Thus, a new pattern P3' is formed with two fields "d" and "E".

In other words, at a point of which period T1 changes to period T2 shown in FIG. 7B, the pattern P3 changes to the pattern P3'. Thus, it is determined that the patterns of the repeat fields of the input video data VIN are discontinuous.

FIG. 8B shows another example of which patterns of repeat fields are discontinuous. In FIG. 8A, a top field "H" is a repeat field. On the other hand, in FIG. 8B, the top field "H" is a normal field. Accurately speaking, although the top field "H" should have been detected as a repeat field originally, the top field "H" had been incorrectly detected as a normal field in the repeat field detecting process.

When the top field "H" is determined as a normal field, since the pattern P2 cannot be formed with three fields "G", "g", and "H" that are preceded by the pattern P1 formed with fields "F" and "f", a new pattern P1' is formed with two fields "G" and "g".

In other words, at a point of which period T1 changes to period T2, since the pattern P1 changes to the pattern P1', it is determined that the patterns of the repeat fields of the input video data VIN are discontinuous.

FIGS. 7B and 8B show just examples of which patterns of repeat fields are discontinuous. In other words, patterns of repeat fields are discontinuous in various manners as well as the examples shown in FIGS. 7B and 8B.

Figure 9:
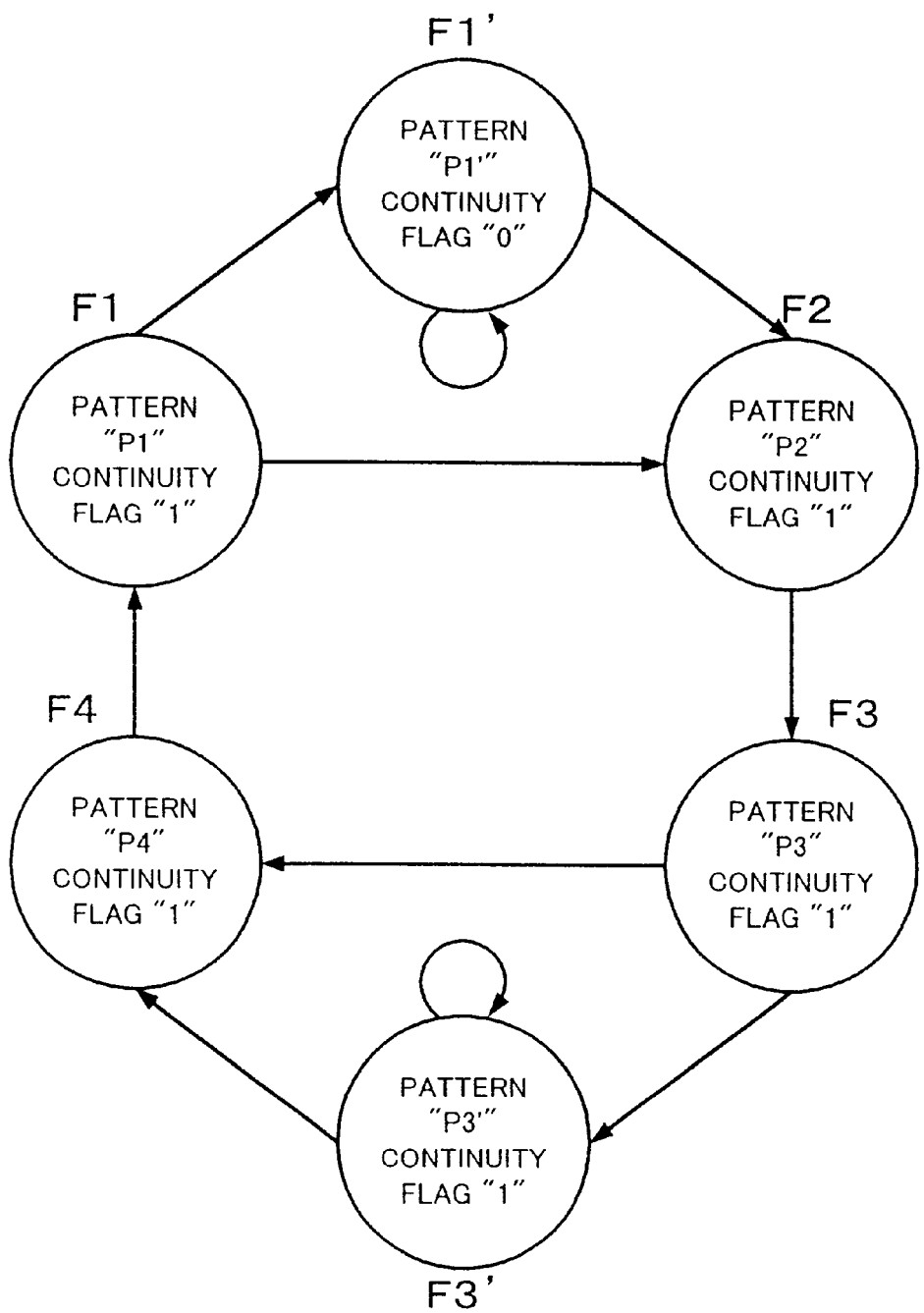
FIG. 9 is a schematic diagram showing a state transition corresponding to a pattern.

FIG. 9 is a schematic diagram showing a transition of states corresponding to the six patterns (P1, P2, P3, P4, P1', and P3') described with reference to FIGS. 7 and 8. In FIG. 9, state F1 corresponds to the pattern P1. State F2 corresponds to the pattern P2. State F3 corresponds to the pattern P2. State F3 corresponds to the pattern P3. State F4 corresponds to the pattern P1. State F3' corresponds to the pattern P3'. State F1' corresponds to the pattern P1'.

As described in FIGS. 7A and 8A, when repeat fields of input video data are regularly and continuously detected, the patterns P1 to P4 are continuously assigned. In other words, when repetitive patterns of input video data are continuous, a main loop of state F1→state F2→state F3→state F4→state F1 is repeated.

On the other hand, as described with reference to FIGS. 7B and 8B, when repeat fields of input video data are not regularly and continuously detected, the patterns P1' or P3' are assigned instead of patterns P2 or P4. In other words, when repetitive patterns of input video data are discontinuous, state F1' is assigned after state F1 or F4, and state F3 is assigned after state F3 or F2.

Figure 10:
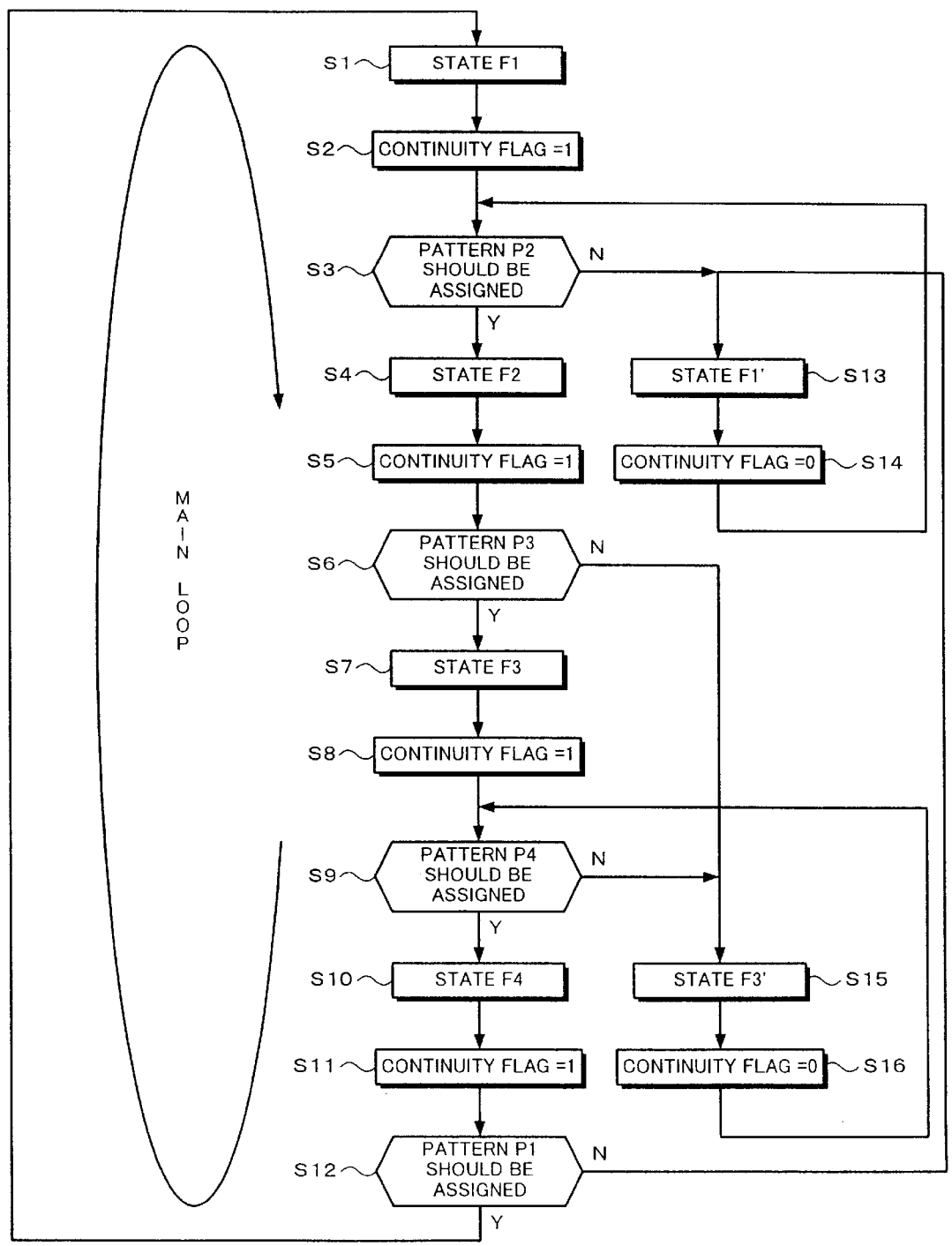
FIG. 10 is a schematic diagram showing a pattern analyzing process performed by a pattern analyzing portion.

Next, with reference to FIG. 10, the pattern analyzing process performed by the pattern analyzing portion 110 in the case that the detected results of the repeat fields shown in FIG. 7B will be described.

At step S1, the pattern analyzing portion 110 determines a frame formed with the top field "A" and the bottom field "a" as the pattern P1. In the transition loop shown in FIG. 9, when the transition state at step S1 is state F1, the repeat field is continuous. Thus, at step S2, the pattern analyzing portion 110 sets the continuity flag to "1".

At step S3, the pattern analyzing portion 110 determines whether or not the pattern P2 should be assigned after the pattern P1. In reality, the pattern analyzing portion 110 determines whether or not the pattern P2 can be formed with the three fields "B", "b", and "C" preceded by the fields "A" and "a" determined as the pattern P1. In other words, when the top field "B" is a normal field, the bottom field "b" is a normal field, and the top field "C" is a repeat field, the pattern P2 can be formed with the three fields. In this case, the pattern analyzing portion 110 determines that state F1 changes to state F2. Thus, the flow advances to step S4.

When the top field "B" is a repeat field, the bottom field "b" is a repeat field, or the top field "C" is a normal field, the pattern analyzing portion 110 determines that state F1 changes to state F1'. Thus, the flow advances to step S13.

At step S4, a flame formed with the three fields "B", "b", and "C" is determined as the pattern P2. In the transition loop shown in FIG. 9, when the transition state at step S4 is state F2, the repeat field is continuous. Thus, at step S5, the pattern analyzing portion 110 sets the continuity flag to "1".

At step S6, the pattern analyzing portion 110 determines whether or not the pattern P3 should be assigned after the pattern P2. In reality, the pattern analyzing portion 110 determines whether or not the pattern P2 can be formed with the two fields "D" and "c" preceded by the fields "B", "b", and "C" determined as the pattern P2. In other words, when the top field "D" is a normal field and the bottom field "c" is a normal field, the pattern P3 can be formed with the two fields. In this case, the pattern analyzing portion 110 determines that state F2 changes to state F3. Thus, the flow advances to step S7.

When the top field "D" is a repeat field or the bottom field "c" is a repeat field, the pattern analyzing portion 110 determines that state F2 changes to state F3'. Thus, the flow advances to step S15.

At step S7, a frame formed with the two fields "D" and "c" is determined as the pattern P3. In the transition loop shown in FIG. 9, when the transition state at step S7 is state F3, since the repeat field is continuous, the flow advances to step S8. At step S8, the pattern analyzing portion 110 sets the continuity flag to "1".

At step S9, the pattern analyzing portion 110 determines whether or not the pattern P4 should be assigned after the pattern P3. In reality, the pattern analyzing portion 110 determines whether or not the pattern P4 can be formed with the three fields "d", "E", and "e" preceded by the fields "c" and "D" determined as the pattern P3. In other words, when the bottom field "d" is a normal field, the top field "E" is a repeat field, and the bottom field "e" is a repeat field, the pattern P4 can be formed with the three fields. In this case, the pattern analyzing portion 110 determines that state F3 changes to state F4. Thus, the flow advances to step S10.

When the bottom field "d" is a repeat field, the top field "E" is a repeat field, or the bottom field "e" is a normal field, the pattern analyzing portion 110 determines that state F changes to state F3'. Thus, the flow advances to step S15. For example, in the determined result shown in FIG. 7B, since the top field "E" is determined as a repeat field, the pattern P4 cannot be formed with the three fields "d", "E", and "e". Thus, the flow advances to step S15.

At step S15, a frame formed with the two fields "d" and "E" is determined as the pattern P3'. In the transition loop shown in FIG. 9, when the transition state at step S15 is state F3', the repeat field is discontinuous. Thus, the flow advances to step S16. At step S16, the pattern analyzing portion 110 sets the continuity flag to "0". Thereafter, the flow returns to step S9.

At step S9, it is determined whether or not the pattern P4 can be formed with the three fields "e", "F", and "f" preceded by the pattern P3'. In the example shown in FIG. 7B, since the pattern P4 cannot be formed with the three fields "e", "F", and "f", the flow advances to step S15.

In other words, until the pattern P4 is generated in the input video data, a loop of steps S15, S16, and S19 is repeated. In the example shown in FIG. 7B, since the pattern P4 can be formed with the fields "i", "J", and "k", until the pattern P4 formed with the fields "i", "J", and "k" is generated, the loop is repeated. In the loop of the steps S15, S16, and S9 (namely, in period T2), the generated pattern is P3' and the continuity flag is "0".

At step S10, a frame formed with the three fields "i", "J", and "k" is determined as the pattern P4. In the transition loop shown in FIG. 9, when the transition state at step S10 is state F4, since the repeat field is continuous, the flow advances to step S11. At step S11, the pattern analyzing portion 110 sets the continuity flag to "1".

At step S12, the pattern analyzing portion 110 determines whether or not the pattern P1 should be assigned after the pattern P4. In reality, the pattern analyzing portion 110 determines whether or not the pattern P1 can be formed with two fields "K" and "k" preceded by the fields "i", "J", and "k" determined as the pattern P4. In other words, when the top field "K" is a normal field and the bottom field "k" is a normal field, the pattern P1 can be formed with the two fields. In this case, the pattern analyzing portion 110 determines that state F4 changes to the step F1. Thus, the flow returns to step S1.

When the top field "K" is a repeat field or the bottom field "k" is a repeat field, the pattern analyzing portion 110 determines that state F4 changes to state F3'. Thus, the flow advances to step S13.

In other words, as described above, in the example shown in FIG. 7B, the pattern analyzing portion 110 outputs the continuity flag="1" that represents that a repeat field is continuous in period T1 of the pattern P1 to the pattern P4. The pattern analyzing portion 110 outputs the continuity flag="0" that represents that a repeat field is discontinuous in period T2 of the pattern P3'. The pattern analyzing portion 110 outputs the continuity flag="1" that represents that a repeat field is continuous in period T2 of the pattern P1 to the pattern P4.

Next, with reference to FIG. 10, the pattern analyzing process performed by the pattern analyzing portion 110 in the case that the detected results of the repeat fields shown in FIG. 8B are obtained will be described.

The pattern analyzing portion 110 performs the main loop process of step S1 to step S12 for the top field "A" to the bottom field "e". When the pattern analyzing portion 110 performs the process for the top field "F" and the bottom field "f", the flow returns to step S1. The process of the pattern analyzing portion 110 performed for the top field "A" to the bottom field "e" is the same as that shown in FIG. 7B. Thus, for simplicity, only the process of the pattern analyzing portion 110 for the top field "F" and the bottom field "f" will be described.

At step S1, the pattern analyzing portion 110 determines a frame formed with the top field "F" and the bottom field "f" as the pattern P1. In the transition loop shown in FIG. 9, when the transition state at step S1 is state F1, since the repeat field is continuous, the flow advances to step S2. At step S2, the pattern analyzing portion 110 sets the continuity flag to "1".

At step S3, the pattern analyzing portion 110 determines whether or not the pattern P2 should be assigned after the pattern P1. In reality, the pattern analyzing portion 110 determines whether or not the pattern P2 can be formed with the three fields "G", "h", and "H" preceded by the fields "F" and "f" determined as the pattern P1. In other words, when the top field "G" is a normal field, the bottom field "g" is a normal field, and the top field "H" is a repeat field, the pattern P2 can be formed with the three fields. In this case, the pattern analyzing portion 110 determines that state F1 changes to state F2. Thus, the flow advances to step S4.

When the top field "G" is a repeat field, the bottom field "g" is a repeat field, or the top field "H" is a normal field, the pattern analyzing portion 110 determines that state F1 changes to state F1'. Thus, the flow advances to step S13. For example, in the example of the determined results of the repetitive pattern determining process shown in FIG. 8B, since the top field "H" is determined as a normal field, the pattern P4 cannot be formed with the three fields "G", "g" and "H". Thus, the flow advances to step S13.

At step S13, a frame formed with the two fields "G" and "g" is determined as the pattern P1'. In the transition loop shown in FIG. 9, when the transition state at step S13 is state F1', since the repeat field is discontinuous, the flow advances to step S14. At step S14, the pattern analyzing portion 110 sets the continuity flag to "0". Thereafter, the flow returns to step S4.

At step S4, it is determined whether or not the pattern P2 can be formed with the three fields "H", "h", and "I" preceded by the pattern P1'. In the example shown in FIG. 8B, since the pattern P4 cannot be formed with the three fields "H", "h", and "I", the flow advances to step S13.

In other words, until the pattern P2 is generated in the input video data, the loop of step S13, step S14, and step S3 is repeated. In the example shown in FIG. 8B, since the pattern P4 can be formed with the three fields "L". "l", and "M", until the pattern P4 formed with the fields "L", "l", and "M" is generated, the loop is repeated. In the loop of step S13, step S14, and step S3 (namely, in period T2), the pattern P1' is generated and the continuity flag is "0".

As is clear from the above description, as with the example shown in FIG. 7B, in the example shown in FIG. 8B, the pattern analyzing portion 110 outputs the continuity flag="1" that represents that the pattern of the repeat field is continuous in period T1 during which the pattern P1 to the pattern P4 are repeated at a regular order. The pattern analyzing portion 110 outputs the continuity flag "0" that represents that a repetitive flag is discontinuous in period T2 during which the pattern P3' is repeated. The pattern analyzing portion 110 outputs the continuity flag="1" that represents that the pattern of the repeat field is continuous in period T3 during which the pattern P1 to the pattern P4 are repeated at the regular order.

When the occurrence sequence of repeat fields contained in input video data VIN is continuous, the pattern analyzing portion 110 supplies the continuity flag="1" to the inverse pull-down controlling portion 114. When the occurrence sequence of repeat fields contained in input video data VIN is discontinuous, the pattern analyzing portion 110 supplies the continuity flag="0" to the pull-down controlling portion 114.

In addition, the pattern analyzing portion 110 searches 120 flags (that represent whether or not each field is a repetitive file) buffered in the FIFO register 112, counts the number of flags "1" that represent repeat fields, and supplies the count value C to the inverse pull-down controlling portion 114. Since the 120 flags represent up to 24 repeat fields, the count value C ranges from 0 to 24.

The inverse pull-down controlling portion 114 controls the address managing portions 100 and 122, the threshold registers 116 and 118, and the video encoding portion 20 corresponding to the continuity flags received from the pattern analyzing portion 110 so as to perform the inverse 2:3 pull-down process.

When a continuity flag received from the pattern analyzing portion 110 is "1", the inverse pull-down controlling portion 114 performs the inverse 2:3 pull-down process for removing a field determined as a repeat field by the comparator 108. When a continuity flag received from the pattern analyzing portion 110 is "0", the inverse pull-down controlling portion 114 does not perform the inverse 2:3 pull-down process so as to not remove a field determined as a repeat field by the comparator 108.

With reference to FIG. 7B, a real example of the inverse 2:3 pull-down process will be described. In period T1 of which a continuity flag received from the pattern analyzing portion 110 is "1", the inverse 2:3 pull-down controlling portion 114 outputs read addresses for the fields "A", "B", "D", "a", "b", and "c" to the address managing portion 122 so as to read the fields "A", "B", "D", "a", "b", and "c" other than the field "C" determined as a repeat field by the comparator 108 in the fields "A" to "D" and "a" to "c" that are input from the address managing portion 100. In other words, the normal 2:3 pull-down process for removing all fields determined as repeat fields is performed.

On the other hand, in period T2 of which a continuity flag received from the pattern analyzing portion 110 is "0", the inverse pull-down controlling portion 114 controls the address managing portion 122 so as not to remove fields determined as repeat fields by the comparator 108. In reality, the inverse pull-down controlling portion 114 outputs read addresses for all the fields "E" to "I" and "d" to "h" received from the address managing portion 100 to the address managing portion 122 so as to read all the fields from the memory 102 in such a manner that the fields "E", "d", and "H" determined as repeat fields are not removed.

In other words, only when the sequence of the repeat fields contained in the input video data VIN is regular and the patterns of repeat fields are continuous, the inverse pull-down controlling portion 114 controls various circuits to perform the inverse 2:3 pull-down process. On the other hand, when the sequence of the repeat fields contained in the input video data VIN is irregular and the patterns of repeat fields are discontinuous, the inverse pull-down controlling portion 114 controls various circuits not to perform the inverse 2:3 pull-down process.

Since the inverse pull-down process is performed as described above, even if the normal field "E" (not a repeat field) is incorrectly determined as a repeat field, the field "E" is not removed from the input video data by the 2:3 pull-down process.

When the inverse 2:3 pull-down process is performed for a video program of which normal video data of 30 Hz has been placed in video data that has been processed with the 2:3 pull-down process, only repeat fields contained in video data that has been processed with the 2:3 pull-down process are removed, and it is prevented that normal fields of video data of 30 Hz are incorrectly removed.

In addition, the inverse pull-down controlling portion 114 performs a process for updating the threshold value T used in the formulas (1) and (2) corresponding to the following formula (3).

$$T = k \times 1/C \quad (3)$$

where T is the threshold value used in the formulas (1) and (2); C is the count value received from the pattern analyzing portion 110; and k is a coefficient.

Next, the reason why the threshold value T used in the formulas (1) and (2) is updated corresponding to the formula (3) will be described.

As is clear from the formula (3), as the count value C received from the pattern analyzing portion 110 increases, the threshold value T decreases. Thus, as the count value C decreases, the threshold value T increases. When the threshold value T becomes small (close to 0), the detecting conditions for repeat fields expressed by the formulas (1) and (2) become loose. When the threshold value T becomes large, the detecting conditions for repeat fields expressed by the formulas (1) and (2) become strict.

As the detecting conditions for repeat fields become loose, repeat fields can be easily detected. However, in this case, the probability of which a normal field is incorrectly determined as a repeat field becomes high. On the other hand, as the detecting conditions for repeat fields become strict, normal fields can be easily detected. However, the probability of which a repeat field is incorrectly detected as a normal field becomes high.

In other words, as the count value C becomes large, the detecting conditions for repeat fields become loose. As the count value C becomes large, the detecting conditions for repeat fields become strict. In other words, while video data processed with the 2:3 pull-down process is being supplied as input video data VIN to the inverse pull-down processing portion 10, since the count value C becomes large, the detecting conditions for repeat fields are relatively loose. While normal video data that has not been processed with the 2:3 pull-down process is being supplied as input video data VIN to the inverse pull-down processing portion 10, since the count value C becomes small, the detecting conditions for repeat fields become strict. In other words, the detecting conditions for repeat fields against video data that has been processed with the 2:3 pull-down process are more strict than those against normal video data of 30 Hz.

In addition, the inverse pull-down controlling portion 114 generates control signals that are a prediction mode control signal, a DCT mode control signal, and a scan mode control signal corresponding to a continuity flag received from the pattern analyzing portion 110. The control signals "Scnt" are supplied to the video encoding portion 20. The control signals "Scnt" are used to select a prediction mode, a DCT mode, and a scan mode of the encoding process of the video encoding portion 20.

When a continuity flag supplied from the pattern analyzing portion 110 to the inverse pull-down controlling portion 114 is "0", it means that the input video data VIN does not contain a repeat field or that patterns of repeat fields of the input video data are discontinuous. Thus, when the continuity flag received from the pattern analyzing portion 110 is "0", the inverse pull-down controlling portion 114 controls the video encoding portion 20 to perform an encoding process with a prediction mode determined by the normal prediction determining process. In this case, the inverse pull-down controlling portion 114 supplies a prediction mode control signal="0" to the video encoding portion 20.

When a continuity flag supplied from the pattern analyzing portion 110 to the inverse pull-down controlling portion 114 is "1", it means that patterns of repeat fields of input video data are continuous (in other words, the input video data has been processed with the 2:3 pull-down process). Thus, when a continuity flag received from the pattern analyzing portion 110 is "1", the inverse pull-down controlling portion 114 controls the video encoding portion 20 to perform an encoding process in a frame prediction mode. In this case, the inverse pull-down controlling portion 114 supplies a prediction mode control signal="1" to the video encoding portion 20.

Likewise, when a continuity flag received from the pattern analyzing portion 110 is "0", the inverse pull-down controlling portion 114 controls the video encoding portion 20 to perform an encoding process in a DCT mode determined with a normal DCT mode determining process. In this case, the inverse pull-down controlling portion 114 supplies a DCT mode control signal="0" to the video encoding portion 20.

When the continuity flag received from the pattern analyzing portion 110 is "1", the inverse pull-down controlling portion 114 controls the video encoding portion 20 to perform an encoding process in a frame DCT mode. In this case, the inverse pull-down controlling portion 114 supplies a DCT mode control signal="1" to the video encoding portion 20.

Likewise, when a continuity flag received from the pattern analyzing portion 110 is "0", the inverse pull-down controlling portion 114 controls the video encoding portion 20 to scan DCT coefficients in an alternate scan mode. In this case, the inverse pull-down controlling portion 114 supplies a scan mode control signal="0" to the video encoding portion 20.

When a continuity flag received from the patten analyzing portion 110 is "0", the inverse pull-down controlling portion 114 controls the video encoding portion 20 to scan DCT coefficients in a zigzag scan mode. In this case, the inverse pull-down controlling portion 114 supplies a scan mode control signal="1" to the video encoding portion 20.

Next, the reason why the video encoding portion 20 controls the prediction mode, the DCT mode, and the scan mode corresponding to a continuity flag received from the pattern analyzing portion 110 will be described.

When a continuity flag is "1", it means that input video data VIN is video data of which a film material has been processed with the 2:3 pull-down process. Video data generated from a optical film material by a unit such as a telecine unit is progressive scanned video data. This is because when two fields is formed with one frame of an optical film material, image data of the two fields is the same on time axis.

Thus, when video data that has been processed with the 2:3 pull-down process is encoded, the video encoding portion 20 is controlled to perform the encoding process by using frame prediction mode and a frame DCT mode rather than by using one of prediction modes whichever smaller prediction error and one of DCT modes whichever smaller generated bits amount so as to generate decoded video data having a natural image.

When the progressive scanned video data processed with the 2:3 pull-down process is encoded, DCT coefficients are scanned in the zigzag scan mode so as to effectively obtain signal components of progressive scanned video data.

When a continuity flag is "0", input video data VIN is interlace-scanned video data shot by a video camera. A top field of a frame of interlace-scanned video data is shifted in time from a bottom field thereof by 1/60 second period.

Thus, when such interlace-scanned video data is encoded, the video encoding portion 20 is controlled to perform an encoding process in one of prediction modes whichever smaller prediction error and one of DCT modes whichever smaller generated bits amount rather than in a predetermined prediction mode and a predetermined DCT mode so as to effectively perform the encoding process.

When interlace-scanned video data is encoded, DCT coefficients are scanned in the alternate scan mode so as to effectively obtain signal components of interlace-scanned video data.

The threshold register 116 is a circuit that buffers the threshold value T generated by the inverse pull-down controlling portion 114. The buffered threshold value T is supplied to the switch 120. The threshold register 116 is a register that is used in a digital broadcasting system of which the inverse pull-down processing portion 10 and the video encoder 20 transmit an encoded video stream on real time basis.

The threshold value register 118 is a circuit that buffers a threshold value T' generated by the inverse pull-down controlling portion 114. The buffered threshold value T' is supplied to the switch 120. The threshold value register 116 is a register that is used in a storage system of which the inverse pull-down processing portion 10 and the video encoder 20 record an encoded stream to a storage medium.

The switch circuit 120 is a circuit that switches a circuit corresponding to a control signal received from the inverse pull-down controlling portion 114 and an external control signal. For example, when the inverse pull-down processing portion 10 is applied to a digital broadcasting system that transmits an encoded video stream on real time basis. the switch circuit 120 is connected to a terminal a. When the inverse pull-down processing portion 10 is applied to a storage system that records an encoded stream to a storage medium, the switch circuit 120 is connected to a terminal b.

Figure 11:
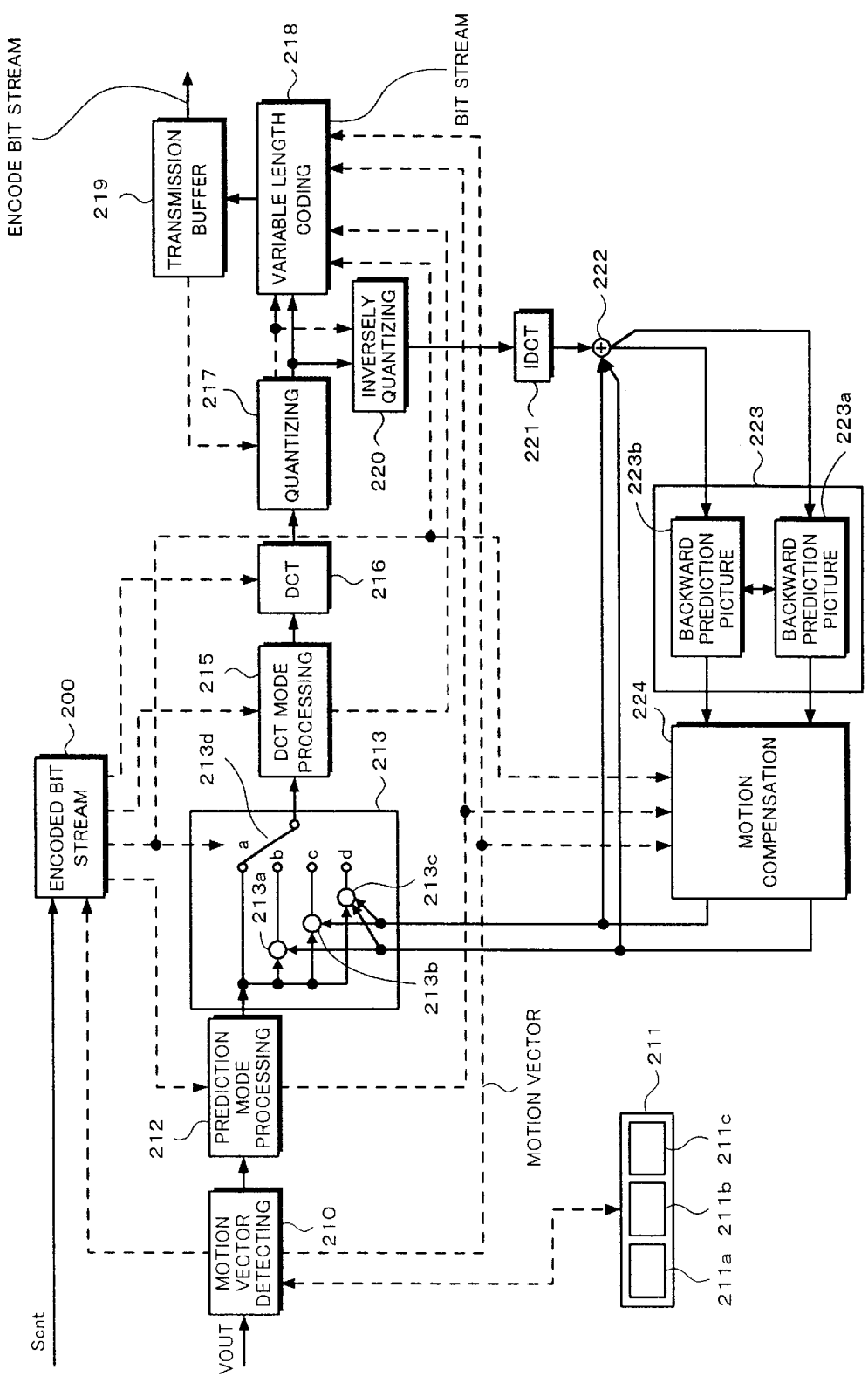
FIG. 11 is a block diagram showing the structure of an example of a video encoding portion corresponding to MPEG standard.

Next, with reference to FIG. 11, the structure of the video encoding portion 20 corresponding to the MPEG standard and an encoding process thereof will be described.

In the MPEG standard, there are three encoded picture types I, P, and B. In an I picture (Intra-coded picture), when a picture signal is encoded, information of only one picture is used. Thus, when an encoded picture signal is decoded, information of only the I picture is used. In a P picture (Predictive-coded picture), as a predictive picture (a reference picture for obtaining a difference with the current P picture), an I picture or another P picture that has been decoded is temporally followed by the current P picture. In a B picture (Bidirectionally predictive-coded picture), as predictive pictures (reference pictures for obtaining a difference with the current B picture), three types of pictures that are an I picture or a P picture that is temporally followed by the current B picture, an I picture or a P picture that is temporally preceded by the current B picture, and an interpolated picture formed with these two types of pictures.

Video data that has been processed with the inverse 2:3 pull-down process by the inverse pull-down processing portion 10 is input as macroblocks to a motion vector detecting circuit 210. The motion vector detecting circuit 210 processes video data of each frame as an I picture, a P picture, or a B picture corresponding to a predetermined sequence. A picture of each frame that is sequentially input is processed as an I picture, a P picture, or a B picture corresponding to the length of each GOP.

Video data of a frame processed as an I picture is supplied from the motion vector detecting circuit 210 to a forward original picture portion 211a of a frame memory 211 and then stored. Video data of a frame processed as a B picture is supplied from the motion vector detecting circuit 210 to an original picture portion 211b of the frame memory 211 and then stored. Video data of a frame processed as a P picture is supplied from the motion vector detecting circuit 210 to a backward original picture portion 211c of the frame memory 211 and then stored.

When a picture of a frame processed as a B picture or a P picture is input at the next timing, video data of the first P picture stored in the backward original picture portion 211c is transferred to the forward original picture portion 211a. Video data of the next B picture is stored (overwritten) to the original picture portion 211b. Video data of the next P picture is stored (overwritten) to the backward original picture portion 211c. These operations are successively repeated.

A prediction mode processing circuit 212 is a circuit that converts macroblocks of a picture that is read from the frame memory 211 into a frame structure or a field structure corresponding to a prediction flag received from an encoding controller 200. When a prediction flag received from the encoding controller 200 represents a frame prediction mode, the prediction mode processing circuit 212 outputs macroblocks in the frame structure. When a prediction flag received from the encoding controller 200 represents a frame prediction mode, the prediction mode processing circuit 212 outputs macroblocks in the field structure.

Next, the format of macroblocks in the frame structure corresponding to the frame prediction mode and the format of macroblocks in the field structure corresponding to the field prediction mode will be described.

Figure 12B:
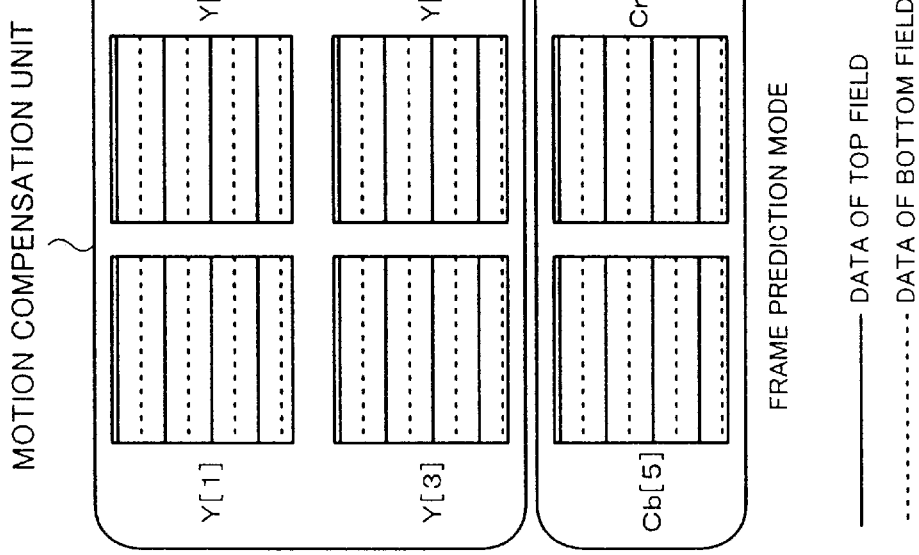
FIGS. 12A and 12B are schematic diagrams showing macroblock structures.
Figure 12A:
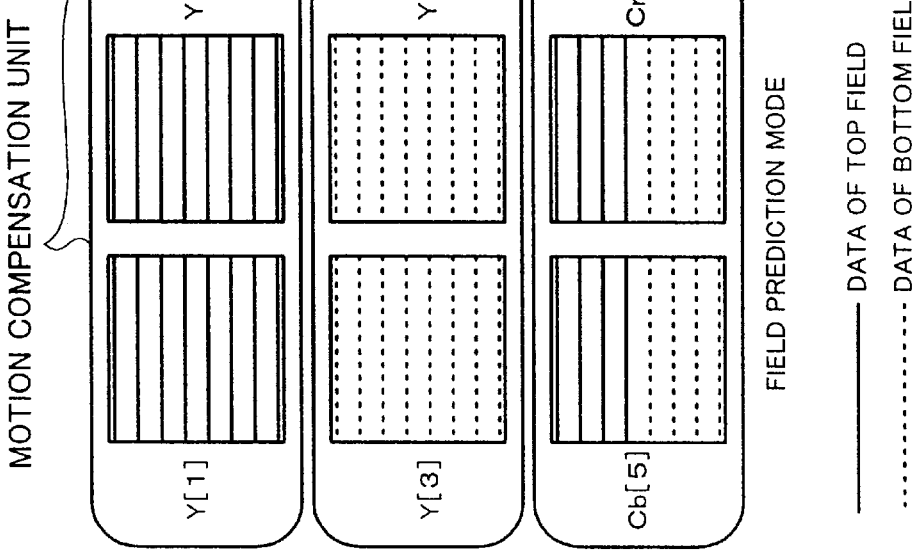

As shown in FIG. 12A, macroblocks in the frame structure are macroblocks of which data of top field (odd field) lines and data of bottom field (even field) lines coexist in each luminance macroblock. Thus, in the frame prediction mode, four luminance macroblocks Y[1] to Y[4] received from the motion vector detecting circuit 210 are macroblocks in the frame structure as shown in FIG. 12A. The prediction mode processing circuit 212 supplies the four luminance macroblocks Y[1] to Y[4] received from the motion vector detecting circuit 210 to a calculating portion 213. In the frame prediction mode, a frame is predicted with four luminance macroblocks at a time. Four luminance blocks correspond to one motion vector. A color difference signal is supplied to the calculating portion 213 in such a manner that data of top field lines and data of bottom field lines coexist.

On the other hand, as shown in FIG. 12B, in macroblocks of the field structure, luminance macroblocks Y[1] and Y[2] are formed with only data of top field lines and luminance macroblocks Y[3] and Y[4] are formed with only data of bottom field lines. Thus, in the field prediction mode, four luminance macroblocks Y[1] to Y[4] in the frame structure are converted into macroblocks in the field structure shown in FIG. 12B and output to the calculating portion 213. In the field prediction mode, two luminance blocks Y[1] and Y[2] correspond to one motion vector. The other two luminance blocks Y[3] and Y[4] correspond to another motion vector. As shown in FIG. 12B, in a color difference signal, the upper half (four lines) of color difference blocks Cb and Cr is a color difference signal of top fields corresponding to the luminance blocks Y[1] and Y[2]. The lower half (four lines) of the color difference blocks Cb and Cr is a color difference signal of bottom fields corresponding to the luminance blocks Y[3] and Y[4].

Next, a selecting process of the encoding controller 200 for the frame prediction mode or the field prediction mode will be described.

The motion vector detecting circuit 210 calculates the sum of absolute values of prediction errors in the frame prediction mode and the sum of absolute values of prediction errors in the field prediction mode and outputs the calculated results to the encoding controller 200 so as to select the frame prediction mode or the field prediction mode. The prediction errors are motion estimation residuals (ME residuals).

The control signals Scnt (the prediction mode control signal, the DCT mode control signal, and the scan mode control signal) are supplied from the inverse pull-down processing portion 10 to the encoding controller 200. The encoding controller 200 receives the prediction mode control signal and the sum of absolute values of prediction errors in the frame prediction mode and the field prediction mode from the inverse pull-down processing portion 10 and controls the prediction mode process of the prediction mode processing circuit 212 corresponding to the prediction mode control signal and the sum of absolute values of prediction errors in the frame prediction mode and the field prediction mode.

First of all, the case that the prediction mode control signal supplied from the inverse pull-down processing portion 10 to the encoding controller 200 is "0" will be described.

When the prediction mode control signal supplied to the encoding controller 200 is "0", the input video data VIN supplied to the inverse pull-down processing portion 10 is video data of which patterns of repeat fields are discontinuous or video data that does not contain repeat fields at all. In other words, the input video data VIN is normal interlaced video data generated by a video camera or the like.

In this case, the encoding controller 200 performs the normal prediction mode selecting process. In the normal prediction determining process, the sum of absolute values of predictive errors in the frame prediction mode and the sum of absolute values of predictive errors in the field prediction mode are compared. Corresponding to the compared result, a prediction mode with a smaller sum is selected. When the sum of absolute values of predictive errors in the field prediction mode is smaller than that in the frame prediction mode, the encoding controller 200 supplies a prediction flag that represents the field prediction mode to the prediction mode processing circuit 212. When the sum of absolute values of prediction errors in the frame prediction mode is smaller than that in the field prediction mode, the encoding controller 200 supplies a prediction flag that represents the frame prediction mode to the prediction mode processing circuit 212.

Next, the case that a prediction mode control signal supplied from the inverse pull-down processing portion 10 to the encoding controller 200 is "1" will be described.

When a prediction mode control signal supplied to the encoding controller 200 is "1", input video data VIN supplied to the inverse pull-down processing portion 10 is video data containing repeat fields that are continuous and regular. Thus, the input video data VIN can be determined as progressive video data which has been processed from a film material by using the 2:3 pull-down process.

In this case, the encoding controller 200 supplies a prediction flag corresponding to a frame prediction mode to the prediction mode processing circuit 212 so as to perform the frame prediction mode process regardless of the compared result of the sum of absolute values of prediction errors in the frame prediction mode and the sum of absolute values of prediction errors in the field prediction mode. Even if it is determined that the sum of absolute values of prediction errors in the field prediction mode is smaller than the sum of absolute values of prediction errors in the frame prediction mode, the encoding controller 200 controls the prediction mode processing circuit 212 to forcedly perform the frame prediction mode process.

The reason why the encoding controller 200 controls the prediction mode processing circuit to forcedly perform the frame prediction mode process is as follows. In the case of progressive video data obtained from a film material, there is no temporal difference between a top field and a bottom field. Thus, when the prediction mode processing circuit 212 performs the frame prediction mode process, encoded video data of a natural pattern can be generated.

As described above, since the video encoding portion 20 can control the prediction mode corresponding to the inverse pull-down process of the inverse pull-down processing portion 10, the encoding process can be properly performed for video data that has been processed with the inverse 2:3 pull-down process.

In addition, the motion vector detecting circuit 210 generates the sum of absolute values of prediction errors in each prediction mode so as to select intra-picture prediction mode, forward prediction mode, backward prediction mode, or bidirectional prediction mode. In reality, the motion vector detecting circuit 210 obtains the difference between the absolute value of the sum of signals Aij of macroblocks of a reference picture and the sum of the absolute value of the signals Aij of the macroblocks (namely, $|\Sigma Aij|-\Sigma|Aij|$) as the sum of absolute values of prediction errors in the intra-picture prediction mode. In addition, the motion vector detecting circuit 210 obtains the sum of the absolute value of the difference between the signals Aij of the macroblocks of the reference picture and signals Bij of macroblocks of a prediction picture (namely, $\Sigma|Aij-Bij|$) as the sum of absolute values of prediction errors in the forward prediction mode. As with the case of the forward prediction mode, the sum of absolute values of prediction errors in each of the backward prediction mode and the bidirectional prediction mode is obtained (however, a prediction picture of each of the backward prediction mode and the bidirectional prediction mode is different from the prediction picture in the forward prediction mode).

The encoding controller 200 receives information of the sum of absolute values in each prediction direction and selects the smallest value from the sum in each prediction direction as the sum of absolute values of prediction errors in the inter-picture prediction mode. In addition, the encoding controller 200 compares the sum of absolute values of prediction errors in the inter-picture prediction mode and the sum of absolute values of prediction errors in the intra-picture prediction mode and selects one of these modes with a smaller value. In other words, when the sum of absolute values of prediction errors in the intra-picture prediction mode is smaller than that in the inter-picture prediction mode, the intra-picture prediction mode is selected. When the sum of absolute values of prediction errors in the inter-picture prediction is smaller than that in the intra-picture prediction, a prediction mode with the smallest value corresponding to the forward prediction mode, the backward prediction mode, or the bidirectional prediction mode is selected. The encoding controller 200 supplies a control signal that represents the selected prediction mode to the calculating portion 213.

The calculating portion 213 controls the switch corresponding to a prediction mode control signal received from the encoding controller 200 so as to perform a calculation for the intra-picture prediction mode, the forward prediction mode, the backward prediction mode, or the bidirectional prediction mode. In reality, when a prediction mode control signal received from the encoding controller 200 represents the intra-picture prediction mode, the calculating portion 213 places the switch to a terminal a position. When a prediction mode control signal received from the encoding controller 200 represents the forward prediction mode, the calculating portion 213 places the switch to a terminal b position. When a prediction mode control signal received from the encoding controller 200 represents the backward prediction mode, the calculating portion 213 places the switch to a terminal c position. When a prediction mode control signal received from the encoding controller 200 represents the bidirectional prediction mode, the calculating portion 213 places the switch to a terminal d position.

The motion vector detecting circuit 210 detects a motion vector between a prediction picture and a reference picture corresponding to a prediction mode selected from the above-described four prediction modes by the encoding controller 200 and outputs the motion vector to a variable length code encoding circuit 218 and a motion compensating circuit 224.

A DCT mode processing circuit 215 is a circuit that converts the format of macroblocks supplied to a DCT circuit 216 into macroblocks in a frame structure for a frame DCT process or macroblocks in a field structure for a field DCT process corresponding to a DCT mode control signal received from the encoded controller 200.

Figure 13A:
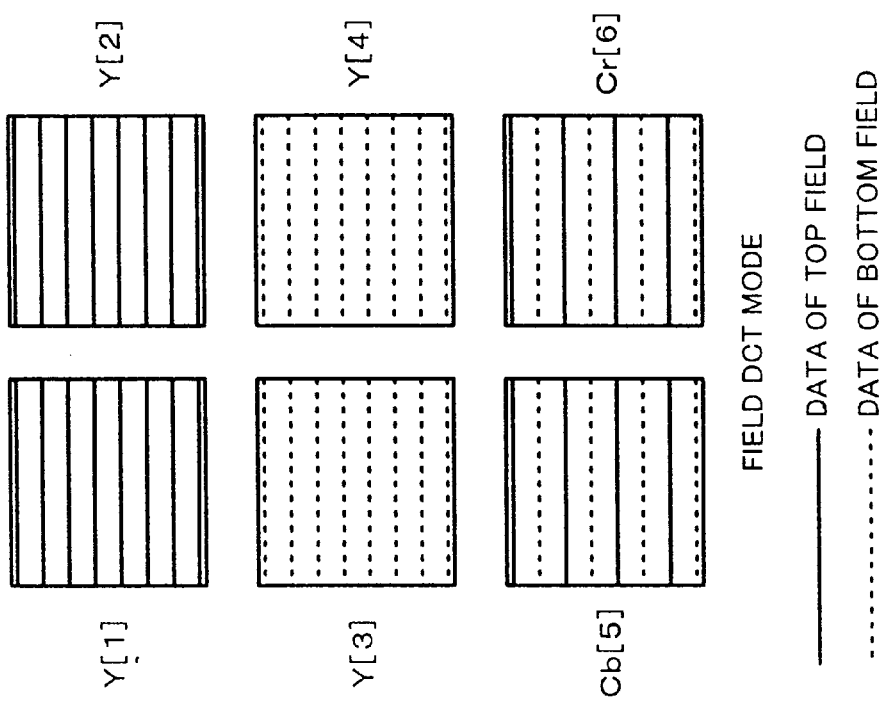
FIGS. 13A and 13B are schematic diagrams showing macroblocks corresponding to DCT modes.
Figure 13B:
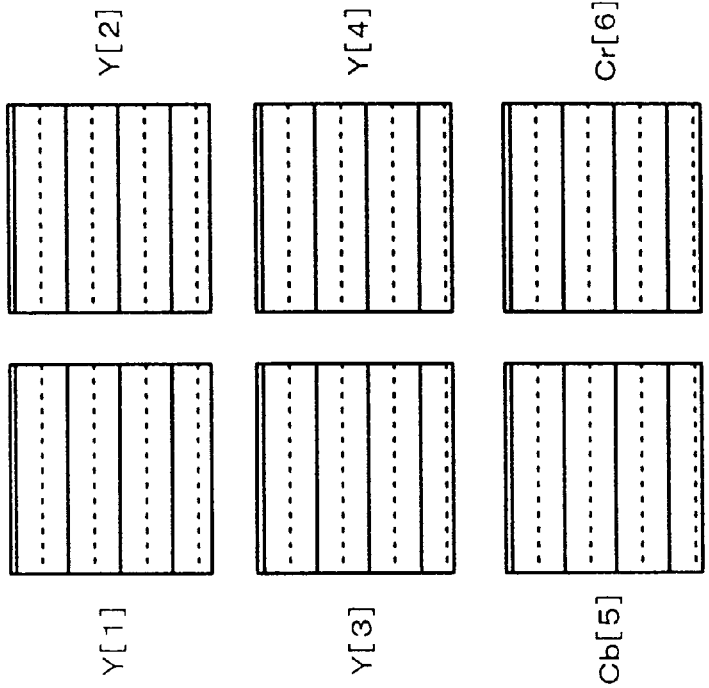

Macroblocks in the frame structure for the frame DCT mode are macroblocks of which top field lines and bottom field lines coexist in each of four luminance macroblocks Y[1], Y[2], Y[3], and Y[4] as shown in FIG. 13A. Macroblocks in the field structure for the field DCT mode are macroblocks of which luminance macroblocks Y[1] and Y[2] of four luminance macroblocks are formed with only top field lines and luminance macroblocks Y[3] and Y[4] are formed with only bottom field lines as shown in FIG. 13B.

Next, a selecting process of the encoding controller 200 for the frame DCT mode or the field DCT mode will be described.

The DCT mode processing circuit 215 virtually calculates a generated bit amount in the case that macroblocks in the frame structure is processed in the frame DCT mode and a generated bit amount in the case that macroblocks in the field structure is processed in the field DCT mode so as to select the frame DCT mode or the field DCT mode. The DCT mode processing circuit 215 supplies the calculated results to the encoding controller 200. Alternatively, in the frame DCT mode, by calculating the sum of the absolute value of the difference of levels of adjacent top fields and the absolute value of the difference of levels of adjacent bottom fields (or the sum of squares), a generated bits amount can be virtually obtained. In the field DCT mode, by calculating the sum of the absolute value of the difference of levels of adjacent lines of a top field and the sum of the absolute value of the difference of levels of adjacent lines of a bottom field, a generated bits amount can be virtually obtained.

The encoding controller 200 receives the DCT mode control signal from the inverse pull-down processing portion 10 and the generated bits amount in the frame DCT mode and the generated bits amount in the field DCT mode from the DCT mode processing circuit 215 and controls the DCT mode for the DCT mode processing circuit 212 corresponding to the DCT mode control signal, the generated bits amount in the frame DCT mode, and the generated bits amount in the field DCT mode.

Next, the case that the DCT mode control signal supplied from the inverse pull-down processing portion 10 to the encoding controller 200 is "0" will be described.

When the DCT mode control signal supplied to the encoding controller 200 is "0", input video data VIN supplied to the inverse pull-down processing portion 10 is video data containing repeat fields whose patterns are discontinuous or video data that does not contain repeat fields. In other words, the input video data VIN can be determined as normal interlaced video data generated by a video camera or the like.

In this case, the encoding controller 200 performs a normal DCT mode determining process. In the normal DCT mode determining process, a generated bits amount in the frame DCT mode received from the DCT mode processing circuit 215 and a generated bits amount in the field DCT mode received from the DCT mode processing circuit 215 are compared. A DCT mode with a smaller generated bits amount is selected corresponding to the compared results. In other words, a DCT mode with higher encoding efficiency is selected. Thus, when the generated bit amount in the field DCT mode is smaller than that in the frame DCT mode, since the encoding efficiency in the field DCT mode is higher than that in the frame DCT mode, the encoding controller 200 selects the field DCT mode. When the generated bits amount in the frame DCT mode is smaller than that in the field DCT mode, since the encoding efficiency in the frame DCT mode is higher than that in the field DCT mode, the encoding controller 200 selects the frame DCT mode. The encoding controller 200 supplies a DCT flag corresponding to the selected frame DCT mode to the DCT mode processing circuit 215.

Next, the case that the DCT mode control signal supplied from the inverse pull-down processing portion 10 to the encoding controller 200 is "1" will be described.

When the DCT mode control signal supplied to the encoding controller 200 is "1", input video data VIN supplied to the inverse pull-down processing portion 10 is video data containing repeat fields that are continuous and regular. Thus, the input video data VIN can be determined as progressive video data that has been generated from a film material and that has been processed with the 2:3 pull-down process.

In this case, the encoding controller 200 controls the DCT mode processing circuit 215 to perform the frame DCT mode process regardless of which of the generated bits amount in the frame DCT mode or the generated bits amount in the field DCT mode received from the DCT mode processing circuit 215 is large so as to perform the frame DCT mode process. Even if it is determined that the generated bits amount in the field DCT mode is smaller than that in the frame DCT mode, the encoding controller 200 supplies the DCT flag to the DCT mode processing circuit 215 to forcedly perform the frame DCT mode process.

The reason why the DCT mode processing circuit 215 forcedly performs the frame DCT mode process is as follows. In the case of progressive video data generated from a film material, there is no temporal difference between a top field and a bottom field. Thus, as shown in FIG. 12A, when the DCT mode processing circuit 215 performs in the frame DCT mode process, encoded video data of a natural pattern can be generated.

As described above, since the video encoding portion 20 can control a DCT mode corresponding to the inverse pull-down process of the inverse pull-down processing portion 10, the video encoding portion 20 can properly encode video data that has been processed with the inverse 2:3 pull-down process.

In addition, the DCT mode processing circuit 215 outputs a DCT flag that represents a selected DCT mode to the variable length code encoding circuit 218 and the motion compensating circuit 224.

The DCT circuit 216 receives video data of an I picture from the DCT mode processing circuit 215, performs the DCT process for the video data, and generates two-dimensional DCT coefficients. In addition, the DCT circuit 216 scans the two-dimensional DCT coefficients in the order corresponding to a selected scan mode.

When the inverse pull-down processing portion 10 supplies a scan mode control signal="0" to the encoding controller 200, since input video data VIN is interlace-scanned video data, the encoding controller 200 controls the DCT circuit 216 to scan the DCT coefficients in the alternative scan method.

On the other hand, when the inverse pull-down processing portion 10 supplies a scan mode control signal="1" to the encoding controller 200, since input video data VIN is progressive-scanned video data that has been processed with the 2:3 pull-down process, the encoding controller 200 controls the DCT circuit to scan the DCT coefficients in the zigzag scan mode.

Since the inverse pull-down processing portion 10 controls the scan mode (the alternate scan mode or the zigzag scan mode), the scanning process can be performed corresponding to the format of a signal to be encoded. Thus, DCT coefficients can be effectively obtained.

The DCT coefficients are output from the DCT circuit 216 to a quantizing circuit 217. The quantizing circuit 217 quantizes the DCT coefficients with a quantizing scale corresponding to a data storage amount (a buffer storage amount) of a transmission buffer 219 and supplies the resultant DCT coefficients to the variable length code encoding circuit 218.

The variable length code encoding circuit 218 converts video data (in this example, data of an I picture) received from the quantizing circuit 217 into variable length code such as Huffman code corresponding to the quantizing scale received from the quantizing circuit 217 and outputs the resultant data to the transmission buffer 219.

The variable length code encoding circuit 218 performs the variable length code encoding process for the motion vector detected by the motion vector detecting circuit 210, the prediction flag that represents the frame prediction mode or the field prediction mode, the prediction mode flag that represents the intra-picture prediction, the forward prediction mode, the backward prediction mode, or the bidirectional prediction mode, the DCT flag that represents the frame DCT mode or the field DCT mode, and the quantizing scale used in the quantizing circuit 217.

The transmission buffer 219 temporarily stores input data and supplies data corresponding to the storage amount to the quantizing circuit 217. When the remaining amount of data of the transmission buffer 219 increases to the allowable upper limit, the transmission buffer 219 increases the quantizing scale of the quantizing circuit 217 corresponding to a quantization control signal so as to decrease the data amount of the quantized data. In contrast, when the remaining amount of data decreases to the allowable lower limit, the transmission buffer 219 decreases the quantizing scale of the quantizing circuit 217 corresponding to the quantization control signal so as to increase the data amount of the quantized data. Thus, the transmission buffer 219 can be prevented from overflowing or underflowing.

Data stored in the transmission buffer 219 is read and output to the transmission portion 30 at a predetermined timing.

On the other hand, data of an I picture that is output from the quantizing circuit 217 is input to an inversely quantizing circuit 220. The inversely quantizing circuit 220 inversely quantizes the data corresponding to the quantizing scale received from the quantizing circuit 217. Output data of the inversely quantizing circuit 220 is input to an IDCT (Inversely Discrete Cosine Transform) circuit 221. The IDCT circuit 221 performs an IDCT process for the data received from the inversely quantizing circuit 220 and supplies the resultant data to a forward prediction picture portion 223*a* of a frame memory 223 through a calculating unit 222.

When the motion vector detecting circuit 210 processes video data of each frame that is sequentially input as I, B, P, B, P, and B pictures, the motion vector detecting circuit 210 processes video data of the first frame as an I picture. Before processing video data of the next frame as a B picture, the motion vector detecting circuit 210 processes video data of the third frame as a P picture. Since a B picture is backward predicted, unless a P picture as a backward prediction picture is prepared before the P picture, the B picture cannot be decoded.

Thus, after processing video data of an I picture, the motion vector detecting circuit 210 processes video data of a P picture stored in the backward original picture portion 211*c*. As with the above-described case, the sum of absolute values of residuals between frames for each macroblock (prediction errors) is supplied from the motion vector detecting circuit 210 to the encoding controller 200. The encoding controller 200 selects the prediction mode (the field prediction mode or the frame prediction mode) corresponding to the prediction mode control signal received from the inverse pull-down processing portion 10 and the sum of absolute values of prediction errors of macroblocks of the P picture.

In addition, the encoding controller 200 sets a prediction mode (the intra-picture prediction mode, the forward prediction mode, the backward prediction, or the bidirectional prediction mode) of the calculating portion 213 corresponding to the sum of absolute values of prediction errors of macroblocks of the P picture. When the intra-picture prediction mode is set, the calculating portion 213 places a switch 213*d* to the contact a position. Thus, as with data of an I picture, data of a P picture is supplied to the transmission path through the DCT mode processing circuit 215, the DCT circuit 216, the quantizing circuit 217, the variable length code encoding circuit 218, and the transmission buffer 219. The data of a P picture is supplied to a backward prediction picture portion 223*b* of the frame memory 223 through the inversely quantizing circuit 220, the IDCT circuit 221, and the calculating unit 222. The supplied data is stored to the backward prediction picture portion 223*b*.

When the forward prediction mode is set, the calculating portion 213 places the switch 213*d* to the contact b position. In addition, picture data (an I picture in the case that the P picture is encoded) stored in the forward prediction picture portion 223*a* of the frame memory 223 is read. The motion compensating circuit 224 compensates the motion of the picture data corresponding to a motion vector that is output from the motion vector detecting circuit 210. In other words, when the encoding controller 200 controls the motion compensating circuit 224 to perform the forward prediction mode process, the motion compensating circuit 224 reads data from the forward prediction picture portion 223*a* in such a manner that the read address of the forward prediction picture portion 223*a* is shifted from the position of the current macroblock by the length of the motion vector and generates prediction video data.

The prediction video data that is output from the motion compensating circuit 224 is supplied to a calculating unit 213*a*. The calculating unit 213*a* subtracts prediction video data corresponding to a macroblock received from the motion compensating circuit 65 from data of a macroblock of a reference picture received from the prediction mode processing circuit 212 and outputs the difference (prediction error). The difference data is supplied to the transmission path through the DCT mode processing circuit 215, the DCT circuit 216, the quantizing circuit 217, the variable length code encoding circuit 218, and the transmission buffer 219. The DCT mode determining process for the DCT mode processing circuit 215 is performed by the encoding controller 200. As with the case of data of an I picture, the encoding controller 200 determines a DCT mode corresponding to the DCT mode control signal received from the inverse pull-down processing portion 10, the generated bit amount in the frame DCT mode, the generated bit amount in the field DCT mode.

Next, the difference data is locally decoded by the inversely quantizing circuit 20 and the IDCT circuit 221 and input to the calculating unit 222. The same data as the prediction video data supplied to the calculating unit 213a is supplied to the calculating unit 222. The calculating unit 222 adds the prediction video data that is output from the motion compensating circuit 224 and the difference data that is output from the IDCT circuit 221. Thus, video data of the original (decoded) P picture is obtained. The video data of the P picture is supplied to the backward prediction picture portion 223b of the frame memory 223 and then stored.

After data of the I picture and data of the P picture are stored to the forward prediction picture portion 223a and the backward prediction picture portion 223b, the motion vector detecting circuit 210 processes a B picture. As with the above-described case, the sum of absolute values of the difference values between frames for macroblocks of the B picture (prediction errors) is supplied from the motion vector detecting circuit 210 to the encoding controller 200. The encoding controller 200 selects a prediction mode (the field prediction mode or the field prediction mode) of the prediction mode processing portion 212 corresponding to the prediction mode control signal received from the inverse pull-down processing portion 10 and the sum of absolute values of prediction errors of macroblocks of the P picture.

In addition, the encoding controller 200 sets a prediction mode (the intra-picture prediction mode, the forward prediction mode, the backward prediction mode, or the bidirectional prediction mode) for the calculating portion 213 corresponding to the sum of absolute values of prediction errors of macroblocks of the P picture.

As described above, in the intra-picture prediction mode or the forward prediction mode, the switch 213d is placed to the contract a position or the contact b position, respectively. At this point, the same process as the case of the P picture is performed and the resultant data is sent.

In contrast, in the backward prediction mode or the bidirectional prediction mode, the switch 213d is placed to the contract c position or the contact d position, respectively. In the backward prediction mode of which the switch 213d is placed to the contact c position, picture data (I picture or P picture in the case that the B picture is encoded) is read from the backward prediction picture portion 223b. The motion compensating circuit 224 compensates the motion corresponding to the motion vector that is output from the motion vector detecting circuit 210. In other words, when the encoding controller 200 controls the motion compensating circuit 224 to perform the backward prediction mode process, the motion compensating circuit 224 reads data from the backward prediction picture portion 223b in such a manner that the read address of the backward prediction picture portion 223b is shifted from the position of the current output macroblock by the length of the motion vector and generates prediction video data.

The prediction video data that is output from the motion compensating circuit 224 is supplied to the calculating unit 213b. The calculating unit 213b subtracts prediction video data received from the motion compensating circuit 224 from data of a macroblock of a reference picture received from the prediction mode processing circuit 212 and outputs the difference. The difference data is sent to the transmission path through the DCT mode processing circuit 215, the DCT circuit 216, the quantizing circuit 217, the variable length code encoding circuit 218, and the transmission buffer 219.

The DCT mode determining process for the DCT mode processing circuit 215 is performed by the encoding controller 200. As with the case of an I picture and a P picture, the encoding controller 200 determines a DCT mode corresponding to the DCT mode control signal received from the inverse pull-down processing portion 10, the generated bit amount in the frame DCT mode, the generated bit amount in the field DCT mode.

As with the above-described process, in the DCT process performed by the DCT circuit 216, when a scan mode control signal received from the inverse pull-down processing portion 10 is "0", the alternate-scan mode is used. When a scan mode control signal received from the inverse pull-down processing portion 10 is "1", the zigzag scan mode is used.

In the bidirectional prediction mode of which the switch 213d is placed to the contact d position, picture data of an I picture and picture data of a P picture are read from the forward prediction picture portion 223a and the backward prediction picture portion 223b, respectively. The motion compensating circuit 224 compensates the motions of the picture data corresponding to the motion vector received from the motion vector detecting circuit 210.

In other words, when the encoding controller 200 controls the motion compensating circuit 224 to perform the bidirectional prediction mode process, the motion compensating circuit 224 reads data from the forward prediction picture portion 223a and the backward prediction picture portion 223b in such a manner that the read addresses of the forward prediction picture portion 223a and the backward prediction picture portion 223b are shifted from the position of the current output macroblock of the motion vector detecting circuit 210 by the lengths of the motion vectors for the forward prediction picture and the backward prediction picture.

The prediction video data that is output from the motion compensating circuit 224 is supplied to the calculating unit 213c. The calculating unit 213c subtracts the average value of prediction video data received from the motion compensating circuit 224 from data of a macroblock of a reference picture received from the motion vector detecting circuit 210 and outputs the difference. The difference data is sent to the transmission path through the DCT mode processing circuit 215, the DCT circuit 216, the quantizing circuit 217, the variable length code encoding circuit 218, and the transmission buffer 219.

Since a B picture is not used as a prediction picture of another picture, the B picture is not stored in the frame memory 223.

In the frame memory 223, when necessary, the forward prediction picture portion 223a and the backward prediction picture portion 223b are bank-switched. In other words, for a particular reference picture, data stored in one of the forward prediction picture portion 223a and the backward prediction picture portion 223b is selected and output as a forward prediction picture or a backward prediction picture.

In the above description, luminance blocks were explained. Likewise, color difference blocks are processed and sent as macroblocks shown in FIGS. 12A to 13B. In a process for a color difference block, a motion vector used in a process for a luminance block is halved in the vertical direction and the horizontal direction is used.

As described above, a video data processing apparatus according to the present invention comprises a repeat field detecting means for detecting the repeat field contained in the video data, an analyzing means for analyzing a pattern of the repeat field contained in the video data corresponding to the detected results of the repeat field detecting means and determining whether the pattern of the repeat field is continuous or discontinuous, a video data processing means for performing an inverse 2 3 pull-down process for removing the repeat field contained in the video data, and a controlling means for controlling the video data processing means to remove a field determined as a repeat field by the repeat field detecting means from the video data in a period that the patten of the repeat field is determined continuous by the analyzing means and for controlling the video data processing means not to remove a field determined as a repeat field by the repeat field detecting means from the video data in a period that the pattern of the repeat field is determined discontinuous by the analyzing means.

A video data processing apparatus according to the present invention comprises a repeat field detecting means for detecting the repeat field contained in the video data, an analyzing means for determining whether or not an occurrence sequence of the repeat field contained in the video data is regular corresponding to the detected results of the repeat field detecting means, a video data processing means for performing an inverse 2:3 pull-down process for removing the repeat field contained in the video data, and a controlling means for controlling the video data processing means to remove a field determined as a repeat field by the repeat field detecting means from the video data in a period that the occurrence sequence of the repeat field is determined regular by the analyzing means and for controlling the video data processing means not to remove a field determined as a repeat field by the repeat field detecting means from the video data in a period that the occurrence sequence of the repeat field is determined irregular by the analyzing means.

In other words, in the video data processing apparatus according to the present invention, since the inverse 2:3 pull-down process is controlled corresponding to the continuity of a pattern of a repeat field or the regularity of an occurrence sequence of repeat fields, when a pattern of a repeat field is continuous, the repeat field is accurately removed. When a pattern of a repeat field is discontinuous, a field incorrectly determined as a repeat field can be prevented from being removed. Thus, in the video data processing apparatus according to the present invention, even if input video data that has been processed with the 2:3 pull-down process contains large noise or video data that has been processed with the 2:3 pull-down process contains video data of 30 Hz, a field that is not a repeat field can be prevented from incorrectly removed.

A video data processing apparatus according to the present invention comprises an analyzing means for analyzing the continuity of a repeat field contained in the video data and determining whether the current field of the video data is a field of the progressive-scanned video material or a field of the interlace-scanned video material, a video data processing means for removing the repeat field from the video data, and a controlling means for controlling the video data processing means to remove a repeat field contained in the progressive-scanned video material and not to remove a field contained in the interlace-scanned video material corresponding to the analyzed results of the repeat field analyzing means.

In the video data processing apparatus according to the present invention, corresponding to the continuity of a pattern of a repeat field contained in input video data, it is determined whether an original material is a progressive material that has been processed with the 2:3 pull-down process or an interlace material that has a frequency of a normal television signal. Corresponding to the determined result, the inverse 2:3 pull-down process is performed for the progressive material. The inverse 2:3 pull-down process is not performed for the interlace material. Thus, even if progressive-scanned video data that has been processed with the 2:3 pull-down process contains interlace-scanned video data of 30 Hz, a field that is not a repeat field can be prevented from being incorrectly removed.

A video data encoding apparatus according to the present invention comprises an analyzing means for analyzing a pattern of the repeat field contained in the video data and determining whether or not the pattern of the repeat field is continuous, a video data processing means for removing the repeat field from the video data, an encoding means for encoding video data that is output from the video data processing means, and a controlling means for controlling the video data processing means to remove a field determined as a repeat field by the repeat field detecting means and perform an encoding process in a frame prediction mode and a frame DCT mode in a period that the pattern of the repeat field is determined continuous by the analyzing means and for controlling the video processing means not to remove a field determined as a repeat field by the repeat field detecting means and perform an encoding process in one of a frame prediction mode and a field prediction mode and one of a frame DCT mode and a field DCT mode in a period that the pattern of the repeat field is determined discontinuous by the analyzing means.

In the video data encoding apparatus according to the present invention, since an encoding mode of the encoding means s controlled corresponding to the continuity of a pattern of a repeat field. Thus, the encoding process can be performed in an encoding mode corresponding to video data that has been processed with the 2:3 pull-down process. In addition, the encoding process can be performed in an encoding mode corresponding to normal video data of 30 Hz. In the video data encoding apparatus according to the present invention, the video data processing means that performs the inverse 2:3 pull-down process is controlled corresponding to the continuity of a pattern of a repeat field. Since a repeat field is securely removed from video data that has been processed with the 2:3 pull-down process, the encoding efficiency can be improved. In addition, a field that is not a repeat field can be incorrectly removed from normal video data of 30 Hz.

A video data encoding apparatus according to the preset invention comprises an analyzing means for analyzing a repetitive pattern of the repeat field contained in the video data and determining whether the current field of the video data is a field of the first video material or a field of the second video material, a video data processing means for removing the repeat field from the video data, an encoding means for encoding video data that is output from the video data processing means, and a controlling means for controlling an operation of the video data processing means and an encoding mode of the encoding means corresponding to the analyzed results of the analyzing means.

A video data encoding apparatus according to the present invention comprises an analyzing means for analyzing the continuity of a repeat field contained in the video data and determining whether the video data is the progressive-scanned video data or the interlace-scanned video data, a video data processing means for removing the repeat field from the video data, an encoding means for encoding video data that is output from the video data processing means, and a controlling means for controlling the video data processing means to remove a repeat field contained in the progressive-scanned video material and not to remove a field contained in the interlace-scanned video material corresponding to the analyzed results of the analyzing means and for controlling the encoding means to select an encoding mode corresponding to the progressive-scanned video material or the interlace-scanned video material.

In other words, in the encoding apparatus according to the present invention, the continuity of a repeat field is analyzed. It is determined whether an original material of input video data is a progressive-scanned video material or an interlace-scanned video material corresponding to the analyzed result. The encoding means is controlled to select an encoding mode for a progressive-scanned video material or an interlaced video material corresponding to the determined result. Thus, the prediction encoding mode, DCT mode, or scan mode corresponding to an original material of input video data can be selected. Thus, the picture quality of encoded video data can be improved.

Moreover, in the video data encoding apparatus according to the present invention, a repeat field is removed from a progressive material that has been processed with the 2:3 pull-down process. Thus, since the redundancy of video data that is encoded can be reduced, the compression-encoding process can be performed with high compression efficiency. In addition, even if a repeat field is detected from an interlaced material, the repeat field is not removed. Consequently, the deterioration of picture quality due to an incorrectly detected repeat field can be securely prevented.

What is claimed is:

1. A video data processing apparatus for removing a repeat field from video data, comprising:
   repeat field detecting means for detecting the repeat field contained in the video data;
   analyzing means for analyzing a pattern of the repeat field contained in the video data corresponding to the detected results of said repeat field detecting means and determining whether the pattern of the repeat field is continuous or discontinuous;
   video data processing means for removing the repeat field contained in the video data; and
   controlling means for controlling said video data processing means to remove a field determined as a repeat field by said repeat field detecting means from the video data in a period that the patten of the repeat field is determined continuous by said analyzing means and for controlling said video data processing means not to remove a field determined as a repeat field by said repeat field detecting means from the video data in a period that the pattern of the repeat field is determined discontinuous by said analyzing means.

2. The video data processing apparatus as set forth in claim 1,
   wherein said analyzing means determines that the pattern of the repeat field is continuous in a period of which predetermined patterns formed with a plurality of fields are regularly repeated, and
   wherein said analyzing means determines that the pattern of the repeat field is discontinuous in a period of which predetermined patterns formed with a plurality of fields are not regularly repeated.

3. The video data processing apparatus as set forth in claim 1, further comprising:
   encoding means for encoding video data that is output from said video data processing means,
   wherein said controlling means controls an encoding mode of said encoding means depending on whether the pattern is continuous or discontinuous.

4. The video data processing apparatus as set forth in claim 3,
   wherein said controlling means controls said encoding means to perform a prediction encoding process in a frame prediction mode in a period that the pattern is determined continuous, and
   wherein said controlling means controls said encoding means to perform a prediction encoding process in one of a frame prediction mode and a field prediction mode in a period that the pattern is determined discontinuous.

5. The video data processing apparatus as set forth in claim 3,
   wherein said controlling means controls said encoding means to perform a prediction encoding process in a frame prediction mode in a period that the pattern is determined continuous, and
   wherein said controlling means controls said encoding means to perform a prediction encoding process in one of a frame prediction mode and a field prediction mode whichever a smaller generated bit amount in a period that the pattern is determined discontinuous.

6. The video data processing apparatus as set forth in claim 3,
   wherein said controlling means controls said encoding means to perform a DCT process in a frame DCT mode in a period that the pattern is determined continuous, and
   wherein said controlling means controls said encoding means to perform a DCT process in one of a frame DCT mode and a field DCT mode in a period that the pattern is determined discontinuous.

7. The video data processing apparatus as set forth in claim 3,
   wherein said controlling means controls said encoding means to perform a DCT process in a frame DCT mode in a period that the pattern is determined continuous, and
   wherein said controlling means controls said encoding means to perform a DCT process in one of a frame DCT mode and a field DCT mode whichever a smaller motion compensation residual in a period that the pattern is determined discontinuous.

8. The video data processing apparatus as set forth in claim 3,
   wherein said controlling means controls said encoding means to scan DCT coefficients in a zigzag scan mode in a period that the pattern is determined continuous, and
   wherein said controlling means controls said encoding means to scan DCT coefficients in an alternate scan mode in a period that the pattern is determined discontinuous.

9. The video data processing apparatus as set forth in claim 3,
   wherein said controlling means controls said encoding means to perform a prediction encoding process in a frame prediction mode, a DCT process in a frame DCT mode, and scan DCT coefficients in a zigzag scan mode in a period that the pattern is determined continuous, and wherein said controlling means controls said encoding means to perform a prediction encoding process in one of a frame prediction mode and a field prediction mode whichever a smaller generated bit amount, perform a DCT process in one of a frame DCT mode and a field DCT mode whichever a smaller motion compensation residual, and scan DCT coefficients in an alternate scan mode in a period that the pattern is determined discontinuous.

10. A video data processing method for removing a repeat field from video data, comprising the steps of:

detecting the repeat field contained in the video data;

analyzing a pattern of the repeat field contained in the video data corresponding to the detected results of the repeat field detecting step and determining whether the pattern of the repeat field is continuous or discontinuous;

removing the repeat field contained in the video data; and controlling the video data processing step to remove a field determined as a repeat field by the repeat field detecting step from the video data in a period that the patten of the repeat field is determined continuous by the analyzing step and the video data processing step not to remove a field determined as a repeat field by the repeat field detecting step from the video data in a period that the pattern of the repeat field is determined discontinuous by the analyzing step.

11. The video data processing method as set forth in claim 10, wherein the analyzing step is performed by determining that the pattern of the repeat field is continuous in a period of which predetermined patterns formed with a plurality of fields are regularly repeated, and wherein the analyzing step is performed by determining that the pattern of the repeat field is discontinuous in a period of which predetermined patterns formed with a plurality of fields are not regularly repeated.

12. The video data processing method as set forth in claim 10, further comprising the step of:

encoding video data that is output from the video data processing step, wherein the controlling step is performed by controlling an encoding mode of the encoding step depending on whether the pattern is continuous or discontinuous.

13. The video data processing method as set forth in claim 12, wherein the controlling step is performed by controlling the encoding step to perform a prediction encoding process in a frame prediction mode in a period that the pattern is determined continuous, and wherein the controlling step is performed by controlling the encoding step to perform a prediction encoding process in one of a frame prediction mode and a field prediction mode in a period that the pattern is determined discontinuous.

14. The video data processing method as set forth in claim 12, wherein the controlling step is performed by controlling the encoding step to perform a prediction encoding process in a frame prediction mode in a period that the pattern is determined continuous, and wherein the controlling step is performed by controlling the encoding step to perform a prediction encoding process in one of a frame prediction mode and a field prediction mode whichever a smaller generated bit amount in a period that the pattern is determined discontinuous.

15. The video data processing method as set forth in claim 12, wherein the controlling step is performed by controlling the encoding step to perform a DCT process in a frame DCT mode in a period that the pattern is determined continuous, and wherein the controlling step is performed by controlling the encoding step to perform a DCT process in one of a frame DCT mode and a field DCT mode whichever a smaller motion compensation residual in a period that the pattern is determined discontinuous.

16. The video data processing method as set forth in claim 12, wherein the controlling step is performed by controlling the encoding step to scan DCT coefficients in a zigzag scan mode in a period that the pattern is determined continuous, and wherein the controlling step is performed by controlling the encoding step to scan DCT coefficients in an alternate scan mode in a period that the pattern is determined discontinuous.

17. The video data processing method as set forth in claim 12, wherein the controlling step is performed by controlling the encoding step to perform a prediction encoding process in a frame prediction mode, a DCT process in a frame DCT mode, and scan DCT coefficients in a zigzag scan mode in a period that the pattern is determined continuous, and wherein the controlling step is performed by controlling the encoding step to perform a prediction encoding process in one of a frame prediction mode and a field prediction mode whichever a smaller generated bit amount, perform a DCT process in one of a frame DCT mode and a field DCT mode whichever a smaller motion compensation residual, and scan DCT coefficients in an alternate scan mode in a period that the pattern is determined discontinuous.

18. A video data encoding apparatus for encoding video data in which a repeat field is placed in a predetermined sequence, comprising;

analyzing means for analyzing a pattern of the repeat field contained in the video data and determining whether or not the pattern of the repeat field is continuous;

video data processing means for removing the repeat field from the video data;

encoding means for encoding video data that is output from said video data processing means; and controlling means for controlling said video data processing means to remove a field determined as a repeat field by said repeat field detecting means and perform an encoding process in a frame prediction mode and a frame DCT mode in a period that the pattern of the repeat field is determined continuous by said analyzing means and for controlling said video processing means not to remove a field determined as a repeat field by said repeat field detecting means and perform an encoding process in one of a frame prediction mode and a field prediction mode and one of a frame DCT mode and a field DCT mode in a period that the pattern of the repeat field is determined discontinuous by said analyzing means.

19. A video data encoding method for encoding video data in which a repeat field is placed in a predetermined sequence, comprising the steps of:

analyzing a pattern of the repeat field contained in the video data and determining whether or not the pattern of the repeat field is continuous;

removing the repeat field from the video data;

encoding video data that is output from the removing step; and controlling the video data processing step to remove a field determined as a repeat field by the pattern analyzing step and perform an encoding process in a frame prediction mode and a frame DCT mode in a period that the pattern of the repeat field is determined continuous by the analyzing step and for controlling the video processing step not to remove a field determined as a repeat field by the pattern analyzing step and perform an encoding process in one of a frame prediction mode and a field prediction mode and one of a frame DCT mode and a field DCT mode in a period that the pattern of the repeat field is determined discontinuous by the analyzing step.

* * * * *